United States Patent [19]
Welsh et al.

[11] Patent Number: 5,411,058
[45] Date of Patent: May 2, 1995

[54] METHOD AND APPARATUS FOR UTILIZING GASEOUS AND LIQUID FUELS IN AN INTERNAL COMBUSTION DEVICE

[76] Inventors: James W. Welsh, 75 Templar Way, Summit, N.J. 07901; Jonathan W. Welsh, 15B Coles Ave., Hackensack, N.J. 07601

[21] Appl. No.: 994,652

[22] Filed: Dec. 22, 1992

[51] Int. Cl.$^6$ ................................................ B67C 3/06
[52] U.S. Cl. ..................................... 137/572; 137/576; 137/574; 220/564
[58] Field of Search ............... 137/571, 572, 574, 575, 137/576; 220/564

[56] References Cited

U.S. PATENT DOCUMENTS

| | | | |
|---|---|---|---|
| 2,424,723 | 7/1947 | Tate | 123/315 |
| 2,703,607 | 3/1955 | Simmonds | 220/564 X |
| 3,319,433 | 5/1967 | Pauliukonis et al. | 220/564 X |
| 3,321,282 | 5/1967 | Schneider et al. | 137/576 X |
| 3,659,742 | 5/1972 | Tagawa | 137/576 X |
| 3,783,841 | 1/1974 | Hirshler, Jr. et al. | 123/576 |
| 4,161,164 | 7/1979 | Mühlberg | 123/551 |
| 4,369,751 | 1/1983 | Batchelor et al. | 123/527 |
| 4,373,493 | 2/1983 | Welsh | 123/525 |
| 4,411,243 | 10/1983 | Hardenberg et al. | 123/577 |
| 4,421,087 | 12/1983 | Schuurman | 123/445 |
| 4,463,734 | 8/1984 | Akeroyd | 123/525 |
| 4,563,982 | 1/1986 | Pischinger et al. | 123/1 A |
| 4,595,474 | 6/1986 | Greco | 137/571 X |
| 4,617,904 | 10/1986 | Pagdin | 123/525 |
| 4,742,801 | 5/1988 | Kelgard | 123/27 GE |
| 4,876,988 | 10/1989 | Paul et al. | 123/1 A |
| 4,878,475 | 11/1989 | Birsa | 123/525 |
| 4,953,515 | 9/1990 | Fehr et al. | 123/526 |

*Primary Examiner*—Willis R. Wolfe, Jr.

[57] ABSTRACT

A system for storing, handling, and controlling the delivery of the gaseous fuel to internal combustion engine powered devices adapted to run simultaneously on both a liquid fuel and a gaseous fuel. The invention provides a control system having a float controlled solenoid for ensuring that a consistent supply of dry gas is delivered to the engine. The invention uses the sensors and computer of the existing electronic fuel delivery system of the device to adjust the amount of liquid fuel delivery to compensate for the amount of gaseous fuel injection. The invention provides a gaseous fuel control system for a dual fuel device which is integrated and compact, and which preferably includes a fuel fill connection for the gaseous fuel. The invention also provides a horizontal fuel reservoir comprised of end interconnected parallel conduits and, preferably, includes two separate compartments and a pressure relief system for permitting expansion into a relief compartment from a main compartment. It also provides horizontal and vertical interchangeable reservoirs with expansion properties filled by weight.

7 Claims, 17 Drawing Sheets

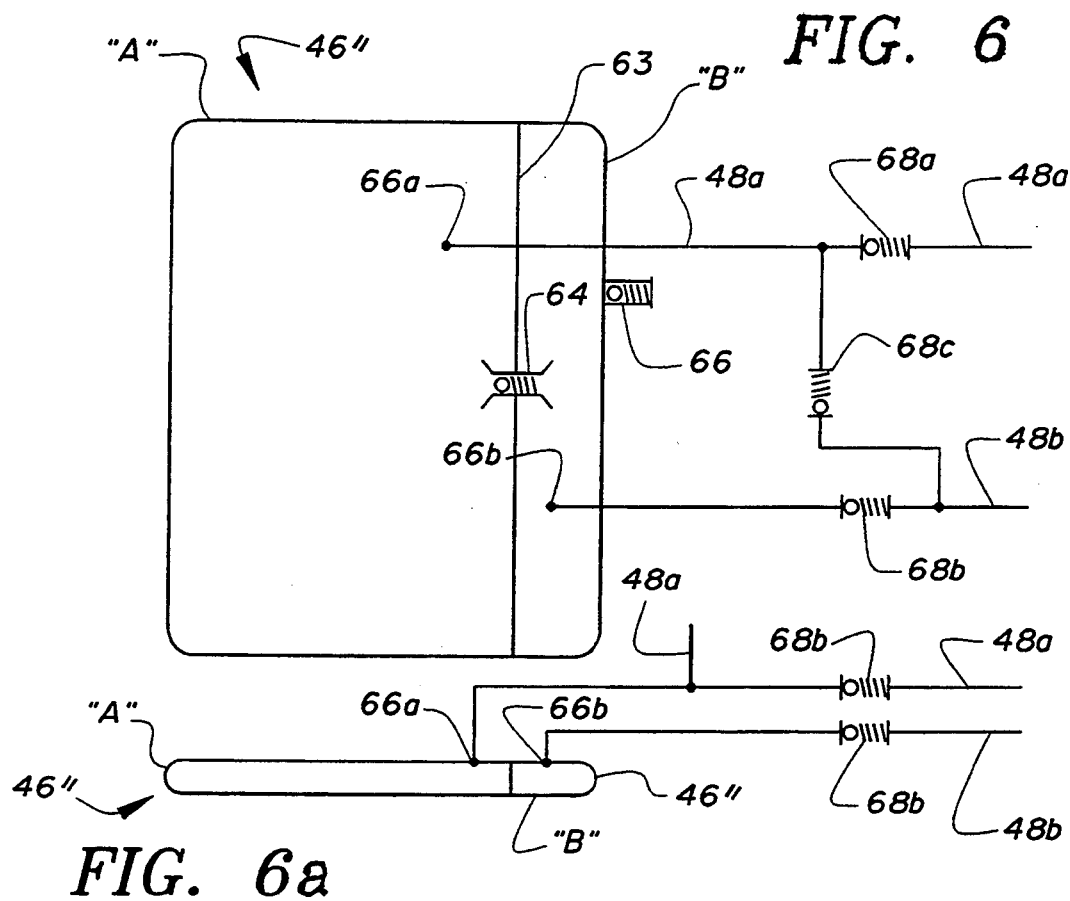
FIG. 6
FIG. 6a
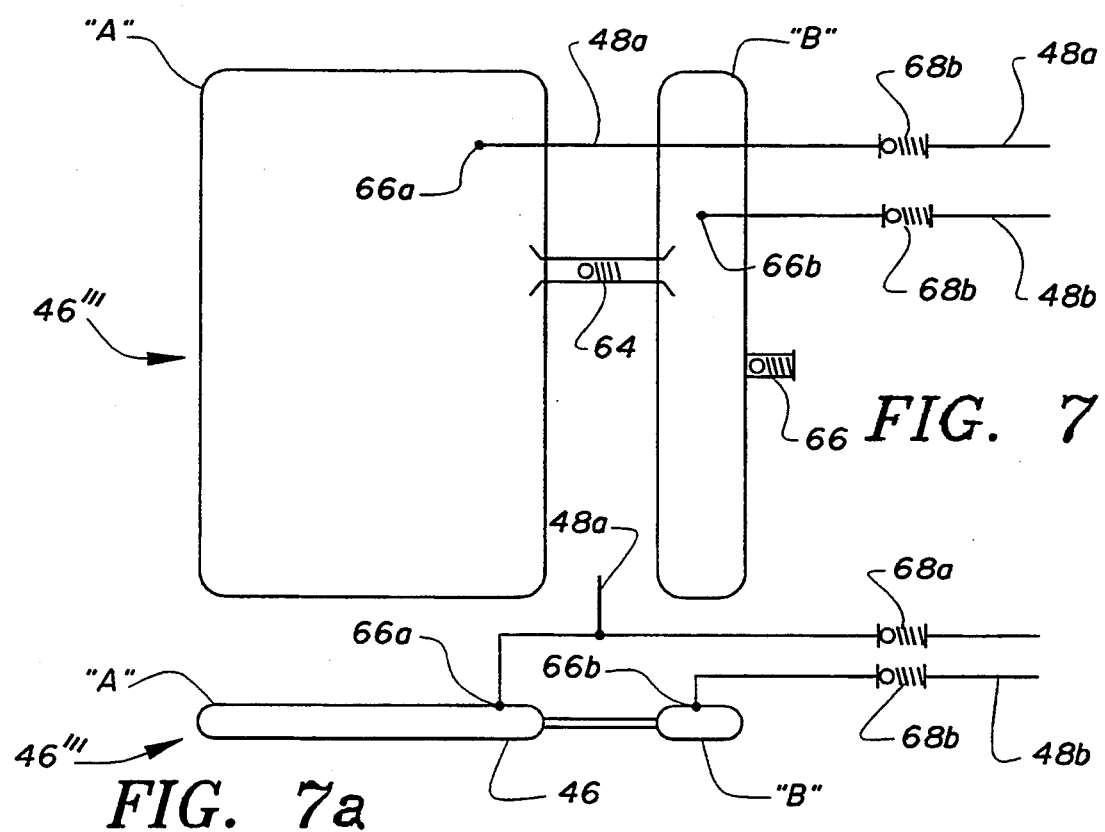
FIG. 7
FIG. 7a

METHOD AND APPARATUS FOR UTILIZING GASEOUS AND LIQUID FUELS IN AN INTERNAL COMBUSTION DEVICE

FIELD OF THE INVENTION

This application relates to internal combustion engine powered vehicles adapted to run simultaneously on both a liquid fuel and a gaseous fuel, and in particular to a system for storing, handling, and controlling the delivery of the gaseous fuel for such vehicles.

BACKGROUND OF THE INVENTION

As gasoline supplies become more scarce and costly, the need for fuel conservation becomes more readily apparent. Accordingly, alternate sources of fuels and methods of fuel conservation have become more attractive, particularly for internal combustion engines for automotive use.

It is known that operation of an internal combustion engine simultaneously on a liquid fuel and a gaseous fuel will increase fuel economy and engine efficiency while at the same time maintaining low levels of undesirable exhaust emissions. Vehicles adapted to run simultaneously on a liquid fuel and a gaseous fuel are sometimes called "dual fuel" or "multi-fuel" vehicles.

The theory by which gaseous fuel injection results in increased liquid fuel economy and decreased emissions is due to the presence of the gaseous fuel surrounding the liquid fuel molecules allowing increased heat to volatilize the liquid fuel in the cylinder, allowing the liquid fuel molecules to form into gaseous fuel to gain energy at the start of combustion causing a maximum release of energy from the liquid fuel. Without the insertion of the gaseous fuel the liquid fuel does not completely volatilize.

With the insertion of the gaseous fuel, once the air-fuel mixture is ignited by electrical discharge of the spark plug, instantaneous oxidation of the fuel mixture occurs and it bursts into flames. The high-energy collisions caused by this rapid volatilization and oxidation dissociate molecules into atoms, or free radicals at greater speed. These molecular fragments therefore react with greater ease and combustion takes place immediately. The wave of combustion is thereby intensified throughout the explosive mixture and occurs at the start of the cycle.

With the addition of gaseous fuel, substantially instantaneous combustion occurs at the start of the piston movement in a substantially constant volume process. In comparison, without the gaseous fuel insertion, the combustion of the liquid fuel occurs throughout the travel of the piston and unburned fuel is still present at the end of the combustion cycle.

Due to this constant volume combustion resulting from the presence of the gaseous fuel molecules, the fuel mixture is totally consumed, resulting in reduced pollutants and unburned fuel hydrocarbons being ported out of the exhaust manifold. This increased combustion also results in less heat being produced in the engine since the energy is being consumed instead of wasted as heat output. In addition, this spontaneous combustion causes higher in-cylinder gas velocity that reduces knock resistance and allows the engine to operate knock free on lower octane rated liquid fuels.

For purposes of the present application, liquid fuel is fuel which is in the liquid phase at ambient atmospheric pressure and temperature. The liquid fuels used by dual or multi fuel vehicles include any combustible liquid fuel that can be utilizable by an internal combustion engine, such as gasoline, diesel, renewable fuels such as alcohol, ethanol, methanol, etc.

The term gaseous fuels as used herein means combustible fuels which are gaseous at standard temperature and pressure. The gaseous fuels used by dual fuel vehicles include methane/natural gas (CNG), hydrogen, sewer gas, etc.

The term gaseous fuels also includes liquified petroleum gas (LPG). LPG is particularly desirable as gaseous fuel. LPG under pressure may be either in the gaseous phase, the liquid phase, or both. Common examples of LPG are propane and butane.

A dual or multi fuel internal combustion vehicle is described in U.S. Pat. No. 4,373,493. For purposes of the present invention, a "dual" or "multi" fuel vehicle or engine is one intended to run on both liquid and gaseous fuels at the same time.

In the system described in U.S. Pat. No. 4,373,493, the gaseous and liquid fuels are fed from separate fuel supplies to be burned in a standard internal combustion engine. The liquid fuel is delivered to a standard carburetor for delivering and mixing of the liquid fuel with the intake air. The idling adjustment screw of the carburetor for the gasoline is adjusted to reduce the flow of the gasoline at the idle condition.

Although the system described in U.S. Pat. No. 4,373,493 functions satisfactorily on carburetor vehicles, recent internal combustion engines have had their fuel and emission control systems updated to include the use of computers, sensors and injectors to control the liquid fuel delivery. It is a discovery of the present invention that such computers and sensors intended for use on an existing liquid fuel only vehicles may be employed without alteration in a dual fuel vehicle. Therefore, in the present invention, the idling adjustment is replaced by the computer and sensors and the constant flow of gaseous fuel allows the liquid fuel to be turned off by the updated control system.

The system disclosed in U.S. Pat. No. 4,373,493 discloses three different types of gaseous fuel reservoirs, one of which is a vertical cylindrical vessel located near the trunk, another of which is a generally flat reservoir constructed as an extension of the existing gasoline tank, and another of which is a single reservoir having a generally rectangular configuration mounted generally horizontally on the underside of the car, between the front and rear axles.

Furthermore, if LPG is stored in these reservoirs, it is difficult to fill to the appropriate level (approximately 80% full) without use of a "spit valve". A spit valve results in discharge of LPG to the environment during the filling operations. Sloshing of LPG in the reservoir or fuel lines due to motion of the vehicle can also cause slugs of liquid LPG to periodically enter the gaseous fuel line leading to the engine intake manifold, resulting at times in uneven and uncontrolled flow of gaseous fuel to the engine.

U.S. Pat. No. 4,373,493 discloses locating the LPG fuel fill at the rear of the vehicle. Although this is satisfactory for many purposes, the rear of the vehicle is subject to being struck from behind in an accident, raising the potential of damage to the gaseous fill line.

Since the rate at which gaseous fuel is used in the system described in U.S. Pat. No. 4,373,493 may vary depending upon engine volume displacement, the amount of gaseous fuel remaining at any given time can be estimated only with some difficulty. Furthermore, where LPG is used as the gaseous fuel, the potential for sloshing of the liquid LPG in the horizontal storage reservoir during motion of the vehicle makes it difficult to determine the amount of LPG remaining at any given time by means of a conventional fuel gauge.

OBJECTS OF THE INVENTION

Accordingly, it is an object of the present invention to provide a system for storing, handling and controlling the gaseous fuel for a dual fuel vehicle which overcomes the foregoing shortcomings of the prior art.

It is a further object of the present invention to provide a gaseous fuel reservoir having a separate compartment and pressure relief system for permitting expansion from a main compartment.

It is a further object of the present invention to provide a fuel storage reservoir for storing both gaseous fuel and liquid fuel.

It is a further object of the present invention to provide a gaseous fuel reservoir which may be readily removed from the dual fuel vehicle for refilling.

It is a further object of the present invention to provide a control system for a dual fuel vehicle which ensures that a consistent supply of dry gas is delivered to the engine.

It is a further object of the present invention to provide a dual or multi fuel vehicle wherein the sensors and electronic controls of the vehicle's existing liquid fuel delivery system adjusts the amount of liquid fuel delivery to compensate for the amount of gaseous fuel injection.

It is a further object of the present invention to provide a gaseous fuel control system for a dual or multi fuel vehicle which is integrated and compact.

It is a further object of the present invention to provide an integrated gaseous fuel control system for a dual or multi fuel vehicle including a fuel fill connection for the gaseous fuel.

It is a further object of the present invention to provide a gaseous fuel fill connection for a dual or multi fuel vehicle which does not spray fuel on an operator during filling.

It is a further object of the present invention to provide a fuel gauge for the gaseous fuel reservoir of a dual or multi fuel vehicle.

It is a further object of the present invention to provide a gaseous fuel storage, handling and control system for a dual or multi fuel vehicle which may be conveniently retrofitted to an existing conventional liquid fuel vehicle.

It is a further object of the invention to provide a dual fuel engine having a storage reservoir for storing both gaseous fuel and liquid fuel.

It is a still further object of the present invention to provide a dual or multi fuel vehicle which permits operation with improved safety and economy.

SUMMARY OF THE INVENTION

These and other objects are realized in accordance with a preferred embodiment of the present invention, which provides a method for utilizing both gaseous and liquid fuels in a standard internal combustion engine having an air intake, combustion chambers, an electronically controlled liquid fuel delivery system and a sensor for sensing the completeness of combustion in said engine, in which the liquid fuel delivery system is controlled at least in part by said sensor. This method comprises the steps of sensing a parameter indicative of completeness of combustion in said engine, supplying liquid fuel to said electronic liquid fuel delivery system, delivering liquid fuel from said liquid fuel delivery system into either said air intake or combustion chambers of said engine at a rate dependent at least in part on the sensed parameter indicative of completeness of combustion, and while said engine is operating, separately supplying gaseous fuel to said air intake at a substantially constant flow rate.

In accordance with another preferred embodiment of the present invention, an apparatus for utilizing both gaseous and liquid fuels in a standard internal combustion engine having an air intake and combustion chambers is provided, comprising a sensor for sensing a parameter indicative of completeness of combustion in said engine, an electronically controlled liquid fuel delivery system for delivering liquid fuel into either said air intake or combustion chambers at a rate controlled at least in part by the parameter indicative of completeness of combustion sensed by said sensor, means for supplying liquid fuel to said liquid fuel delivery system, and means for separately supplying gaseous fuel to said air intake at a substantially constant flow rate while said engine is operating, said rate being substantially independent of engine load.

In accordance with another embodiment of the present invention, a device having an internal combustion engine adapted to operate simultaneously on both a liquid fuel and a gaseous fuel is provided having a liquid fuel storage tank and a separate gaseous fuel storage reservoir including a plurality of end interconnected, generally parallel elongated compartments.

In a preferred form of this embodiment, the device is a vehicle having front and rear axles, and said gaseous storage reservoir is disposed generally horizontally on the underside of said vehicle and between said front and rear axles.

In accordance with another embodiment of the present invention, a storage reservoir for gaseous fuel is provided comprising a primary compartment, and a secondary compartment substantially smaller than said primary compartment, each of said primary and said secondary compartments having separate outlets leading to a common gaseous fuel supply conduit, means for filling said primary compartment with gaseous fuel, and a spring loaded relief valve operatively connected between said primary compartment and said secondary expansion compartment and adapted to permit flow only from said primary compartment to said secondary compartment and only when a minimum differential pressure exists across said spring loaded relief valve.

In accordance with a preferred form of this embodiment, the storage reservoir also includes, a first spring loaded check valve operatively connected between said primary compartment and said output conduit and adapted to permit only outflow from the output of said primary compartment into said common output conduit and only when at least a first minimum differential pressure exists across said first spring loaded check valve and a second spring loaded check valve operatively connected between said secondary compartment and said output conduit and adapted to permit only outflow from the output of said secondary compartment only when at least a second minimum differential pressure exists across said second spring loaded check valve, said second minimum differential pressure being less than said first minimum differential pressure so that outflow from said secondary compartment will be favored over outflow from said primary compartment.

In accordance with another embodiment of the present invention, a gaseous fuel storage system for an internal combustion engine is provided comprising a gaseous fuel storage reservoir, an output conduit from said gaseous fuel storage reservoir to the intake of said engine, and a spring loaded check valve operatively connected between said storage reservoir and said output conduit, said check valve being adapted to permit only outflow from said storage reservoir into said output conduit and only when at least a minimum differential pressure exists across said spring loaded check valve, said minimum differential pressure being sufficient to prevent the formation of a vacuum in said storage reservoir when the pressure in said output conduit is equal to engine vacuum produced in said intake when said engine is operating.

In accordance with another embodiment of the present invention, an apparatus is provided for indicating whether outflow is coming from the first compartment or the second compartment of a storage system for gaseous fuel having a first compartment and a second compartment. The apparatus comprises a pressure containing body, a transparent cover on said body, a flapper in said body having a first side having a first appearance and a second side having a second appearance, first and second inlets from said first and second compartments, respectively, into said body, said flapper being movable between a first position wherein said first side is visible through said transparent cover and a second position wherein said second side is visible through said transparent cover, said first inlet being positioned to direct flow onto said flapper to cause said flapper to move to said first position and said second inlet being positioned to direct flow onto said flapper to cause said flapper to move to said second position.

In accordance with another embodiment of the present invention, an apparatus for utilizing both gaseous fuel and liquid fuels in a standard internal combustion engine is provided comprising a liquid fuel storage tank, liquid fuel conduit means for transporting liquid fuel from said liquid fuel storage tank to means for delivering said liquid fuel to said engine, a gaseous fuel storage reservoir, conduit means for transporting gaseous fuel from said gaseous fuel storage reservoir, said conduit means being positioned in relation to said storage reservoir such that, at times, a mixed phase flow of gaseous and gaseous fuel will be transported through said conduit means, a synergizer comprising a hollow body having a lower portion capable of holding a quantity of liquid and an upper portion intended to be filled with the gas phase of said gaseous fuel and as the pressure is lowered in the upward section, the liquid is transformed into vapor, droplets of liquid will drop back into the lower liquid section of the hollow body, thus the upward gas will be substantially free of liquid, said lower portion including an inlet for receiving said mixed phase flow of gaseous fuel from said conduit means disposed on said lower portion of said hollow body, and said upper portion including an outlet, a float reciprocally movable between a lower first position and a higher second position within said hollow body, said float including metallic material, a proximity switch such as, for example, a magnetic switch disposed outside said hollow body and responsive to the movement of said float between its first position to its second position to change the condition of said proximity switch from closed to open, a solenoid valve operatively connected to said inlet of said hollow body and responsive to the condition of said proximity switch so that when the quantity of liquid present in said hollow body is sufficient to move said float from its first position to its second position and before said quantity of said liquid is sufficiently large to rise to the position of said outlet, said solenoid valve will close, and when the quantity of liquid present in said hollow body becomes sufficiently small to cause said float to move from its second position to its first position, said solenoid valve will open.

In accordance with another embodiment of the present invention, an apparatus for utilizing both gaseous fuel and liquid fuels in a standard internal combustion engine is provided, comprising a liquid fuel storage tank, liquid fuel conduit means for transporting liquid fuel from said liquid fuel storage tank to means for delivering said liquid fuel to said engine, a gaseous fuel storage reservoir, conduit means for transporting gaseous fuel from said gaseous fuel storage reservoir, a portion of said conduit means including a pre-heater for warming the gaseous fuel in said conduit if the heat sink of the hollow body of said synergizer under low ambient temperature does not dissipate the cool temperature from the container, said pre-heater being positioned in relation to a hot portion of said engine so that heat is transmitted to said pre-heater.

In accordance with another embodiment of the present invention, a device having an internal combustion engine adapted to operate simultaneously on both a liquid fuel and a gaseous fuel is provided comprising a liquid fuel storage tank, a gaseous fuel storage reservoir, means for supplying liquid fuel to said engine, means for separately supplying gaseous fuel from said gaseous fuel storage reservoir to an air intake of said engine, means for supplying said gaseous fuel to said air intake at a substantially constant flow rate while said engine is operating, and means for indirectly measuring the amount of gaseous fuel supplied from said gaseous fuel storage reservoir after a period of operation of said device after a fill-up of said gaseous fuel storage reservoir to a pre-determined amount of said gaseous fuel, said means including a timing device having a display, means for resetting said timing device to an initial value, means for initiating timing by said timing device when said means for supplying said gaseous fuel is operating and for terminating timing by said timing device when said means for supplying said gaseous fuel is not operating so that the display displays information that is representative of the amount of gaseous fuel remaining.

In accordance with another embodiment of the present invention, a device having an internal combustion engine adapted to operate simultaneously on both a liquid fuel and a gaseous fuel is provided comprising a liquid fuel storage tank, a gaseous fuel storage reservoir, means for supplying liquid fuel to said engine, means for separately supplying gaseous fuel from said gaseous fuel storage reservoir to an air intake of said engine, and filling means for filling said gaseous fuel storage reservoir, said filling means including a hollow body, a connection on said hollow body adapted to permit sealable and detachable attachment of a filling nozzle, a check valve on said hollow body, said check valve permitting flow into a conduit leading to said gaseous fuel storage reservoir, and a valve in fluid communication with said hollow body and operable to relieve pressure of gaseous fuel remaining within said hollow body into a pressure relief conduit after filling from said filling nozzle and prior to detachment of said filling nozzle from said connection on said hollow body.

In accordance with another embodiment of the present invention, a device having an internal combustion engine adapted to operate simultaneously on both a liquid fuel and a gaseous fuel is provided comprising a liquid fuel storage tank, a gaseous fuel storage reservoir, means for supplying liquid fuel to said engine, means for separately supplying gaseous fuel from said gaseous fuel storage reservoir to an air intake of said engine, and a quick-connect fill connection adapted to mate with and lock in sealable engagement with a mating fill nozzle of the spring loaded lock ring quick-connect type, a check valve in fluid communication with said fill connection, said check valve permitting flow into a conduit leading to said gaseous fuel storage reservoir, and a valve in pressure communication with said fill connection upstream of said check valve, said valve being operable to relieve pressure of gaseous fuel remaining within said fill connection into a pressure relief conduit after filling from said filling nozzle to permit detachment of said filling nozzle from said fill connection.

In accordance with another embodiment of the present invention, an integrated gaseous fuel handling apparatus adapted for attachment as a unit on a device including an internal combustion engine adapted to operate simultaneously on both a liquid fuel and a gaseous fuel is provided, said gaseous fuel handling apparatus comprising means for connecting to a supply conduit leading to a gaseous fuel storage reservoir, fill connection means for receiving a fill nozzle, separator means for separating the gas phase portion of gaseous fuel from any liquid phase which may be present in gaseous fuel from said gaseous fuel storage reservoir, said separator means being adapted to be connected to said supply conduit, a gas phase conduit connected to said separator means for receiving said gas phase, a solenoid valve on said gas phase conduit adapted to selectively permit and prevent flow of said gas phase through said gas phase conduit, and electronically operated control means for actuating said solenoid valve in response to detection of the presence of at least one electrical input indicative of engine operation to cause said solenoid valve to be in the closed position in the absence of detection of said electrical input indicative of engine operation, and means for electrically connecting to said at least one electrical input.

In accordance with another embodiment of the invention, an apparatus is provided comprising an internal combustion engine adapted to operate simultaneously on liquid fuel and gaseous fuel from separate source conduits and a storage reservoir adapted to maintain both liquid fuel and gaseous fuel under pressure. A first conduit means in fluid communication with the lower portion of said storage reservoir is provided for delivering primarily liquid fuel to said engine, and a second conduit means in fluid communication with the upper portion of said storage reservoir is provided for delivering primarily gaseous fuel in the gaseous state to said engine.

In accordance with another embodiment of the invention, a gaseous fuel storage system is provided comprising a base module, said base module being mountable to a mounting surface and including a first quick-connect nozzle and a gaseous fuel storage reservoir configured to be mounted onto said base module. The gaseous fuel storage reservoir includes a second quick-connect nozzle adapted to mate with said first quick connect nozzle when said gaseous fuel storage reservoir is mounted onto said base module.

BRIEF DESCRIPTION OF THE DRAWINGS

These and other objects, features and advantages of the present invention will be apparent to those skilled in the art upon review of the description and drawings herein, wherein:

FIG. 6 depicts a top view of another embodiment of a dual compartment gaseous fuel storage reservoir having an internal separating wall in accordance with the present invention.

FIG. 6a depicts a side view of the dual compartment gaseous fuel storage reservoir depicted in FIG. 6.

FIG. 7 depicts a top view of another embodiment of a dual compartment gaseous fuel storage reservoir having separate compartments in accordance with the present invention.

FIG. 7a depicts a side view of the dual compartment gaseous fuel storage reservoir depicted in FIG. 7.

DETAILED DESCRIPTION

A. Overall System

Figure 1:
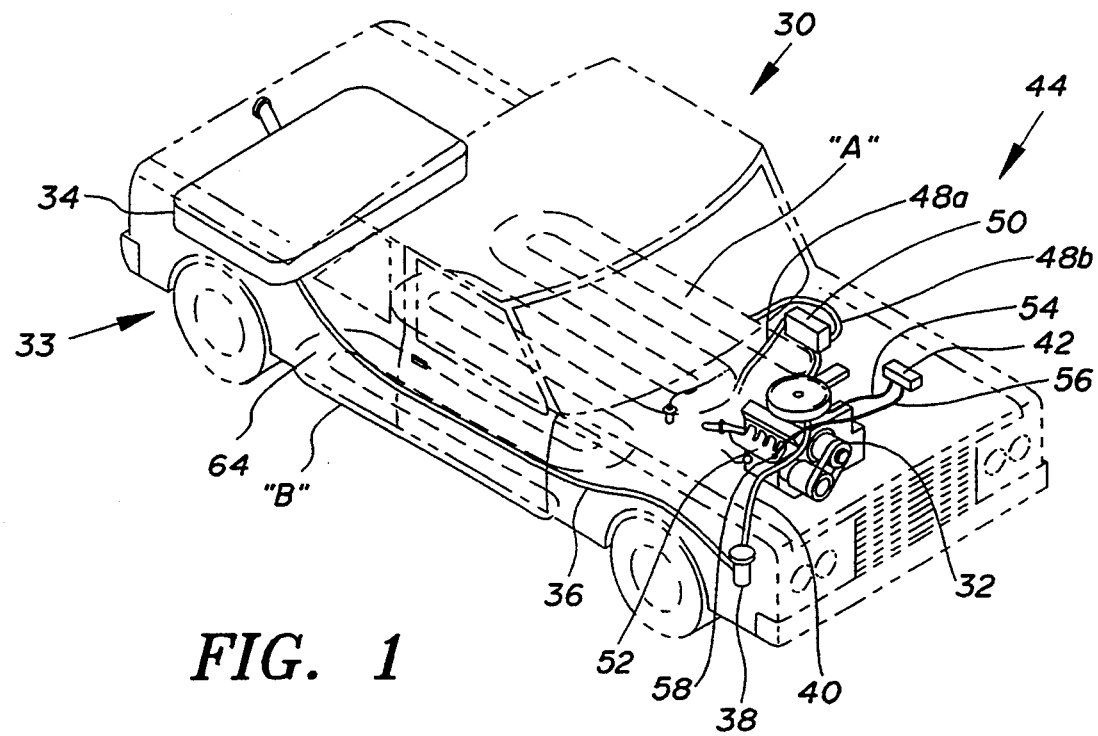
FIG. 1 depicts an overall perspective view, partly in phantom, of a dual fuel vehicle constructed in accordance with the present invention.
Figure 2:
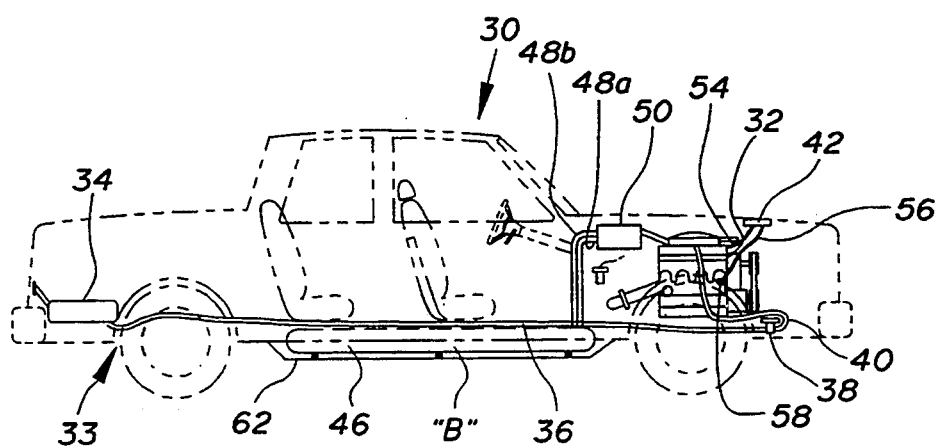
FIG. 2 depicts an overall side view, partly in phantom, of the dual fuel vehicle depicted in FIG. 1.

Referring now to the drawings in detail, FIGS. 1 and 2 depict a dual fuel automobile 30 employing a system in accordance with the present invention, which permits a standard internal combustion engine to run simultaneously on both a liquid fuel and a gaseous fuel. Automobile 30 includes an internal combustion engine 32 and a liquid fuel system 33 including a conventional gasoline tank 34 with a low pressure liquid fuel line 36 leading to fuel pump 38 to pump gasoline through a medium pressure fuel line 40 to the liquid fuel delivery device, which are conveniently a carburetor float, carburetor injectors or injections in the combustion chamber (not shown) controlled by an electronic fuel delivery controller 42, or a carburetor (not shown).

Automobile 30 also includes a gaseous fuel system 44 including a two compartment gaseous fuel storage reservoir 46 having first and second gaseous fuel lines 48$a$ and 48$b$ coming from, respectively, compartments "A" and "B" of storage reservoir 46, and leading to an integrated gaseous fuel control and handling unit 50.

The liquid fuel system 33 and the gaseous fuel system 44 are described in more detail below.

B. Liquid Fuel System

The electronic fuel delivery controller 42 of liquid fuel system 33 is of the same type commonly employed on liquid fuel only vehicles. Indeed, where an existing liquid fuel only vehicle is retrofitted with the dual fuel system of the present invention, the existing electronic fuel delivery system is used without alteration.

The liquid fuel delivery device or devices (not shown) controlled by electronic fuel delivery controller 42 may conveniently be fuel injections configured to inject liquid fuel into the air intake manifold, the intake ports of each cylinder, or the cylinders directly. For purpose of the present invention, any of these locations for liquid fuel delivery may be employed. An electronically controlled or mechanical carburetor in the customary location may also be employed.

Electronic liquid fuel delivery controller 42 includes electronic circuitry and programming enabling it to determine the precise amount of liquid fuel to deliver, and to control the liquid fuel delivery device to deliver that amount of liquid fuel by sending a signal to the delivery device or devices through controller output line 54. Controller 42 receives input from various sensors for monitoring engine condition, including at least an input through input line 56 from a sensor for determining the completeness of combustion, such as exhaust gas sensor 58 on exhaust manifold 52.

Exhaust gas sensor 58 may sense any number of parameters to determine completeness of combustion. For example, sensor 58 may detect the amount of hydrocarbons in the exhaust gas. If excess liquid fuel is delivered into the intake manifold, or injected into the cylinders, exhaust gas sensor 58 will detect an increase in hydrocarbons and deliver an appropriate signal to liquid fuel delivery controller 42. In response, liquid fuel delivery controller 42 will decrease the amount of liquid fuel delivery until the hydrocarbon emissions are lowered to the appropriate level. The same effect can be achieved if sensor 58 detects, for example, the amount of oxygen, $CO_2$, CO etc. in the exhaust gas. Preferably, an oxygen sensor in the exhaust is used. Completeness of combustion can also be determined indirectly by sensing the concentration of hydrocarbons in the intake air for the engine, downstream of the fuel delivery device.

C. Gaseous Fuel System

The components of the present invention for storing, handling and controlling the gaseous fuel will now be described in detail.

1. Gaseous Fuel Storage Reservoir

Gaseous fuel storage reservoir or vessel 46 is depicted in FIGS. 1 to 8. With initial reference to FIGS. 1 to 5, storage reservoir 46 is preferably disposed in a generally horizontal plane, and is generally centrally located under the vehicle, between the front and rear axles, for safety considerations. As diagrammatically depicted in FIG. 5, the central location improves crash-worthiness of storage reservoir 46, since it is away from the front and rear crumple zones 60a and 60b of automobile 30.

Figure 3:
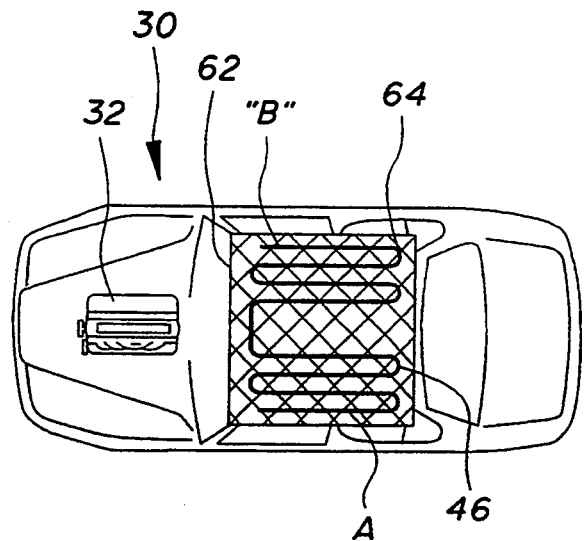
FIG. 3 depicts a top view of an embodiment of a dual fuel vehicle, cut away to show a gaseous fuel storage reservoir in accordance with the present invention.
Figure 4:
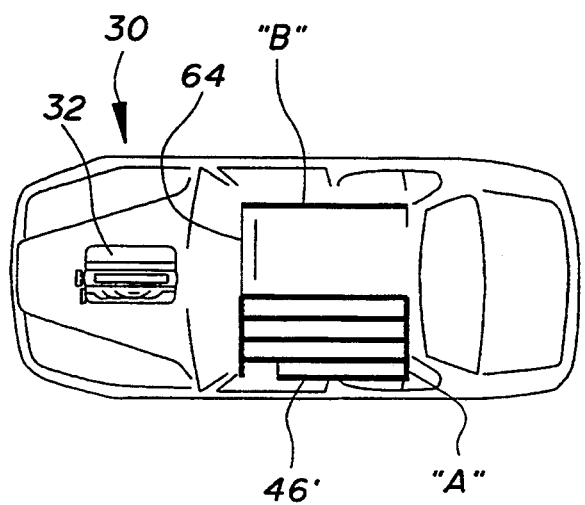
FIG. 4 depicts a top view of an embodiment of a dual fuel vehicle, cut away to show an embodiment of a dual compartment gaseous fuel storage reservoir in accordance with the present invention.
Figure 5:
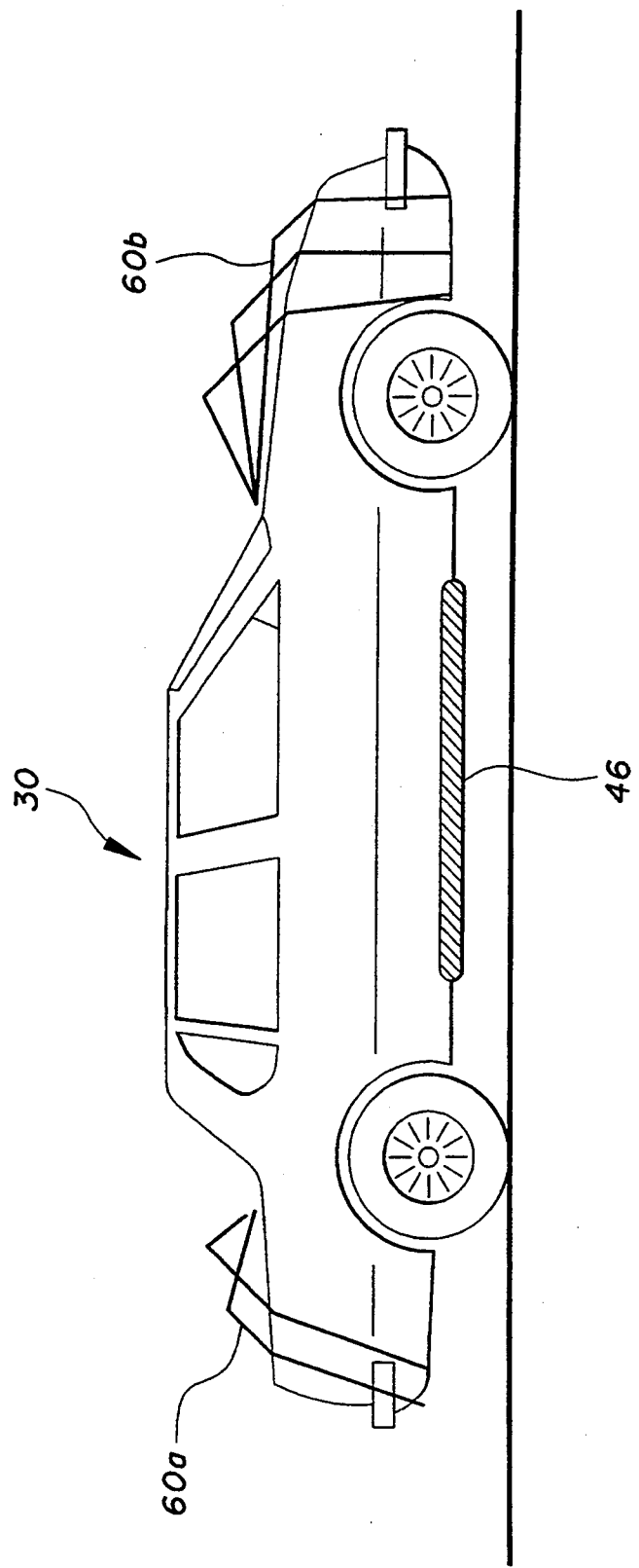
FIG. 5 depicts a side view of an embodiment of a dual fuel vehicle depicting crumple zones of the vehicle, cut away at the bottom to show a gaseous fuel storage reservoir in accordance with the present invention.
Figure 8:
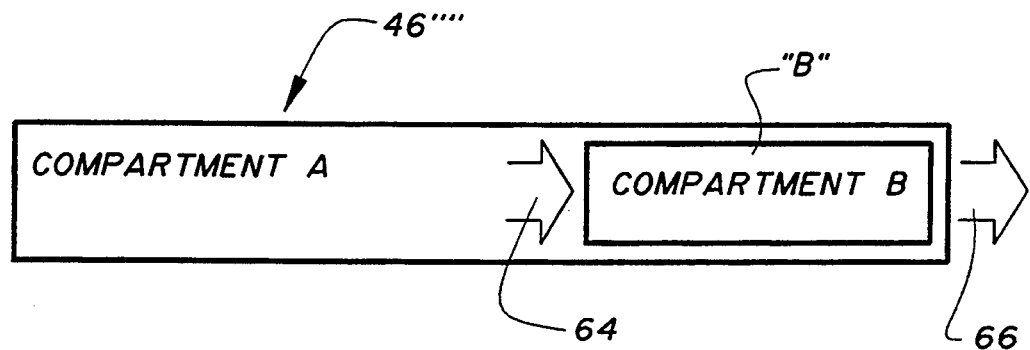
FIG. 8 schematically depicts the operation of the dual compartment gaseous fuel storage reservoir in accordance with the present invention.
Figure 9:
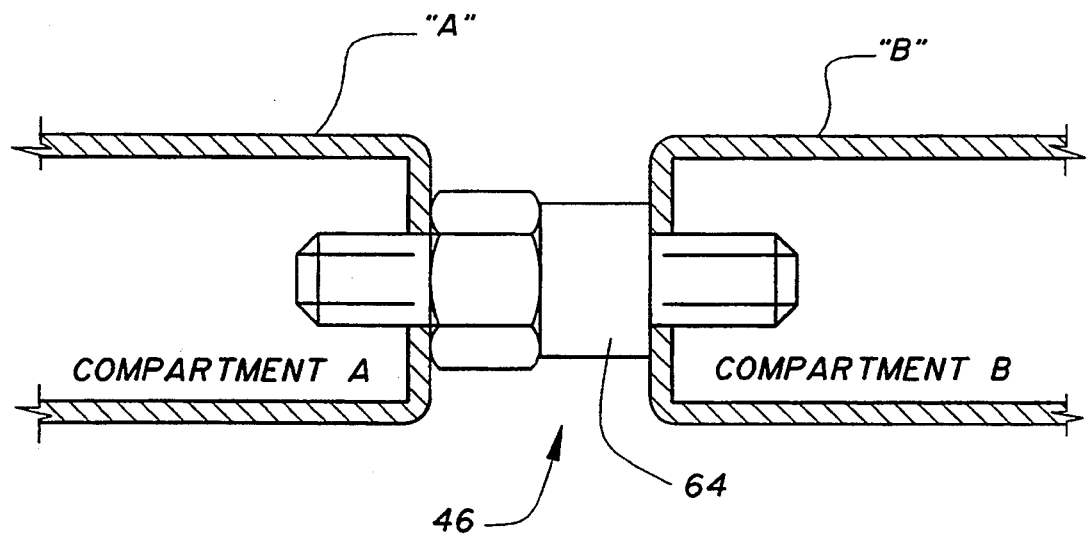
FIG. 9 is a side view, partly in section, of the pressure relief valve connecting the two compartments of the dual compartment storage reservoir in accordance with the present invention.

As depicted in FIGS. 1, 3 and 4, storage reservoir 46 is preferably comprised of a plurality of horizontally disposed, and generally parallel elongated vessels. Advantageously, as depicted in FIGS. 1 and 3, this arrangement is achieved with an arrangement of a plurality of generally parallel conduits, such as rectangular tubing or round pipe, interconnected with 180 degree U-bends in a serpentine manner. The parallel elongated conduits are preferably rectangular tubing and may also be round pipe.

FIG. 4 depicts another arrangement of generally parallel elongated vessels as storage reservoir 46′. In this arrangement, the elongated vessels are mutually end connected with "Tee" connections. It should be noted additionally, that storage reservoir 46 can also be of conventional construction, and be located any convenient place on the vehicle, if desired.

Storage reservoirs 46 (and 46′) provide a number of important advantages over single-vessel configurations, such as are disclosed in U.S. Patent No. 4,373,493.

The parallel conduit configuration has a higher ratio of surface area to volume, thereby improving heat transfer to the storage reservoir. This is especially important where storage reservoir 46 contains propane or other liquified petroleum gas (LPG), since vaporization of LPG from the reservoir may cause cooling of the reservoir. In this case, due to the high ratio of surface area to volume, heat from the outside air can be more effectively transferred to the reservoir to keep it at ambient temperature.

Furthermore, the reservoir of the present invention having a plurality of elongated vessels is more flexible than a single vessel reservoir of the same capacity, and therefore significantly less prone to rupture in a collision. Furthermore, the plurality of elongated vessels have a certain amount of clearance space between them. This provides improved access to components of the vehicle which may otherwise be concealed by a single vessel reservoir of the type disclosed in U.S. Patent No. 4,373,493, and rendered inaccessible. It also permits improved air circulation to the catalytic converter (not shown) of the vehicle, which requires air circulation to avoid overheating. Gaseous fuel storage reservoirs in accordance with the present invention, when attached to the underside of a standard automobile between the front and rear axles, will not protrude substantially below the portions of the underside of said vehicle having the least ground clearance.

For safety considerations, reservoir 46 also includes a metal shield 62 on its underside (depicted in FIGS. 2 and 3) to protect reservoir 46 from damage from rocks, bottoming out and the like. Preferably, metal shield 62 is of porous construction, such as a mesh, to permit air circulation and water drainage.

Storage reservoir 60 is preferably evacuated of air at the factory so purging of the reservoir prior to initial filling is not required. Accordingly, there will be no atmospheric contamination or waste of the propane fuel during initial filling of the reservoir.

Storage reservoir 46 is also preferably designed so that liquid can be pumped through the reservoir to flush it of propane fuel in the event of possible reservoir disposal.

2. Dual Compartment Storage Reservoir

Use of the horizontally disposed, parallel elongated conduit storage reservoir of the present invention, in addition to achieving important advantages, also presents certain difficulties. First of all, it is highly desirable to maintain approximately 20% of vapor space after filling a reservoir with LPG, to permit thermal expansion of the liquid phase LPG in the reservoir due to the possibility of a temperature increase of the reservoir after filling. Conventionally, LPG fuel storage vessels are filled either by weight, by utilizing an automatic 80%—20% internal float cut-off valve, or a "spit valve" to maintain that vapor space of roughly 20% on the top of the interior of the vessel. However, there is very little vertical expansion space in the reservoir of the present invention. Filling by weight is difficult on a vehicle, and use of a "spit valve" is not environmentally desirable.

In the present invention, these difficulties are overcome by providing a two compartment gaseous fuel storage reservoir 46, depicted in FIGS. 1, 4, and 6 to 9. The first compartment, "A", is the primary compartment and is intended to be totally filled with liquid phase gaseous fuel. This eliminates the need to fill only to a set level, i.e, to a "spit valve" or by weight. The second compartment, "B", is substantially smaller that the "A" compartment and is intended primarily as an expansion vessel. Preferably, the "B" compartment is in the range of about 20% of the volume of the "A" compartment, but this is not required.

In the embodiment of storage reservoir 46 shown in FIGS. 1–3, and the embodiment 46′ shown in FIG. 4, a separate parallel elongated vessel is used for compartment "B". FIGS. 6 and 6a show another alternative two compartment storage reservoir 46″ having a single generally rectangular vessel, with an internal wall 63 separating the "A" and "B" compartments. FIGS. 7 and 7a show an alternative two compartment storage reservoir 46‴ having a generally rectangular "A" vessel, with a smaller, separate vessel "B". In the embodiment of storage reservoir 46‴′ shown in FIG. 8, the "B" compartment is contained within the "A" compartment.

In all the embodiments, the two compartments are sealed from each other and from the environment. The "B" compartment is connected to the "A" compartment by means of a spring load pressure relief valve 64, which is conveniently a spring loaded check valve. Relief valve 64 is set to open when at least a minimum differential pressure exists across the valve, and also permits flow only from the "A" compartment to the "B" compartment, but not from "B" to "A". As shown in the various embodiments, pressure relief valve 64 may be mounted internal or externally.

If there is a thermal expansion in compartment "A", the pressure within this compartment increases until the pressure reaches the predetermined differential set pressure of the pressure relief valve 64. As diagrammatically depicted in FIG. 8, the excess pressure is released into compartment "B", which is capable of maintaining the gaseous fuel under pressure. The pressure relief valve allows gaseous fuel to flow into compartment "B", but not back into compartment "A". As an ultimate safety, there is preferably a spring-loaded pressure relief valve 66 from compartment "B" to the atmosphere in the event of a catastrophic thermal expansion.

Of course, if compartment "B" is already full when compartment "A" is filled, the safety feature of the two compartment reservoir design would be inoperative. To ensure that compartment "B" is substantially empty prior to the time for refilling of compartment "A" with additional gaseous fuel, the present invention includes equipment that will favor the use of any fuel vented into compartment "B" before consumption of the fuel stored in compartment "A".

This equipment preferably includes separate fuel outlets 66a and 66b for, respectively, compartments "A" and "B". The fuel line 48a leading to compartment "A" can also preferably be used for filling the reservoir. However, the second fuel line 48b cannot be used for filling compartment "B".

As depicted in FIG. 7, spring-loaded check valves 68a and 68b are respectively connected to the fuel outlet of each compartment. Check valves 68a and 68b are set to permit flow in the flow direction upon reaching respective predetermined differential pressures. Check valve 68a connected to compartment "A" requires a higher differential pressure to permit flow than the check valve 68b connected to compartment "B". Accordingly, fuel contained in compartment B will be favored (i.e., withdrawn first) in operation. However, it is not necessary for the respective predetermined pressures of check valves 68a and 68b to be related to the differential pressure of relief valve 64. These differential pressures may be less than, equal to, or greater than the differential pressure of relief valve 64.

If the gaseous fuel in compartment "A" becomes used up, and the engine of the vehicle continues to run on liquid fuel alone, engine vacuum could potentially create a vacuum in compartment "A". Although it is acceptable to create a vacuum in the relatively small secondary compartment "B", if the vacuum empties vessel "A" of stored gaseous fuel there may be a condition where the vacuum contained in the vessel may allow air to be sucked into the primary compartment "A". Under the correct mixtures of combustive fuels and air, ignition of the combustive gaseous fuel compartment "A" is possible and raises concern of safety. When a storage vessel is pressurized with gaseous fuel there is not a concern of ignition within the vessel.

Accordingly, to prevent formation of a vacuum in at least compartment "A", preferably, the differential pressure of the check valve 68a on the outlet of the "A" compartment is at least sufficient to prevent formation of a vacuum in the primary ("A") compartment. If desired, the differential pressure of the check valve 68b on the outlet may also be sufficient to prevent formation of a vacuum in compartment "B". Of course, the differential pressure of the check valve 68b must in any event be less than the differential pressure of the check valve 68a, so that flow out of the "B" compartment will be favored, as described above.

Figure 17:
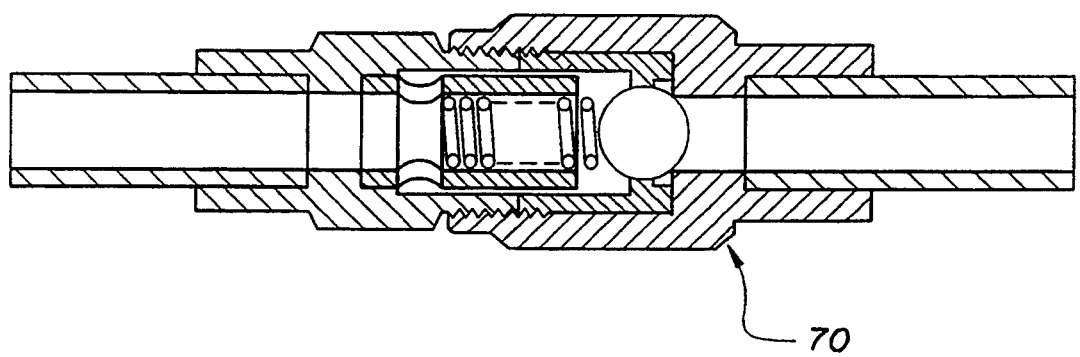
FIG. 17 is a cross sectional view of a spring loaded check valve in accordance with the present invention to ensure that the gaseous fuel storage reservoir remains pressurized at all times despite engine vacuum.

Alternatively, or in addition thereto, a separate check valve 70 downstream of both of the respective check valves on the outlets of compartments "A" and "B" may be employed to prevent formation of a vacuum in compartment "A" and "B". This check valve 70 is depicted in cross section in FIGS. 14 and 17. Separate check valve 70 may also be included as part of the gaseous fuel controller 50 and integrated together with the components of that system onto the same mounting bracket. Either or both of the check valves on the outlets of compartments "A" and "B" may also be integrated with control and handling system 50. Gaseous fuel controller 50 is described in more detail below.

To prevent the possibility of excessive build up of pressure in conduit 48b, a conduit 48c including a spring loaded check valve 68c is preferably disposed between conduit 48b and compartment "A", or the portion of conduit 48a in direct fluid communication with compartment "A", as depicted in FIG. 6a. Excessive pressure in conduit 48c will, thus, be relieved through conduit 48c, through check valve 68c, into conduit 48a, on the compartment "A" side of check valve 68a.

3. Combined Liquid Fuel and Gaseous Fuel Storage Reservoir

Figure 24:
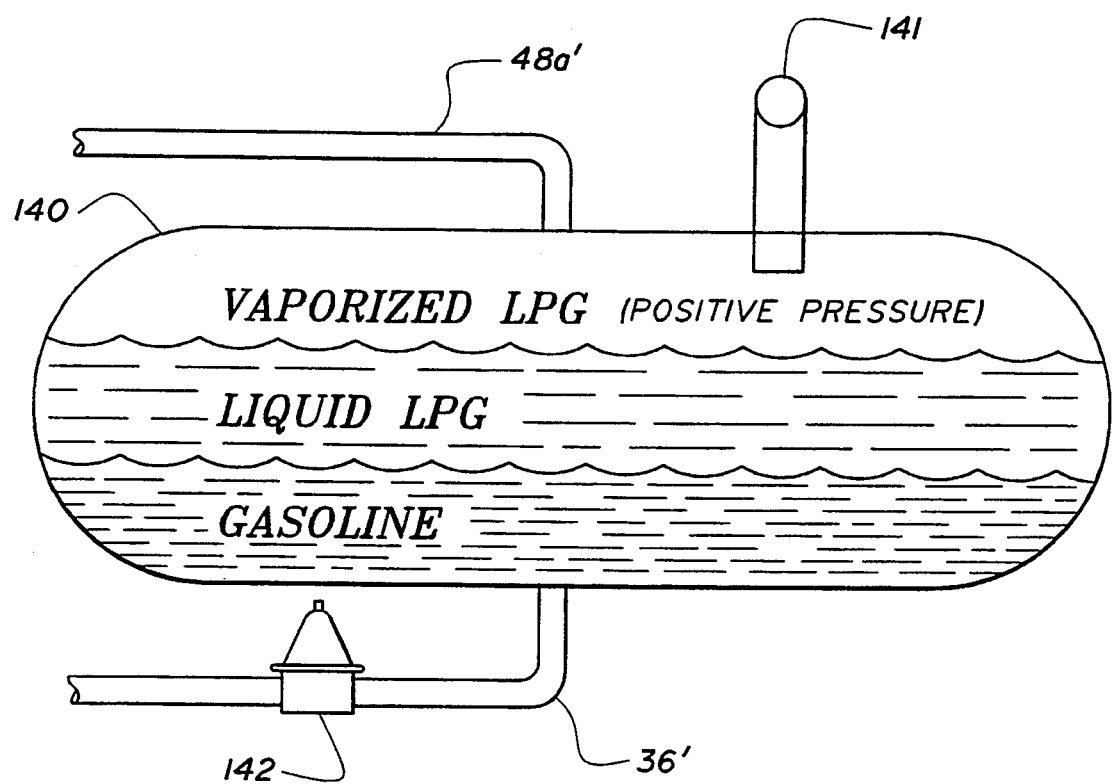
FIG. 24 depicts a combined storage reservoir for storing both liquid and gaseous fuels.

The gaseous fuel and liquid fuel may also be stored in a single, combination fuel storage reservoir 140, as depicted in FIG. 24. This eliminates the need for a separate liquid fuel storage tank. Also, since it is a closed system, it also eliminates the need for extensive gasoline evaporative emissions systems to control the release of evaporative gasoline emissions.

Of course, the pressure in the combination storage reservoir will be above atmospheric pressure, i.e., at a pressure corresponding to the saturation vapor pressure of the mixture of gas phase of the gaseous fuel and the gas phase of the liquid fuel. Thus, liquid fuel must be pumped under into the combined storage reservoir at a pressure at least slightly greater than the pressure in the combination storage reservoir. It should be noted that, since the vapor pressure of the gas phase of the liquid fuel is relatively small in comparison to the vapor pressure of the gas phase of the gaseous fuel, for practical purposes, the pressure in the combination storage reservoir may be considered to be substantially the same as the saturation vapor pressure of the gaseous fuel.

Combination storage reservoir includes a fill connection 230 for both gaseous fuel and liquid fuel, a gaseous fuel outlet conduit 48a' at the top of the reservoir and a liquid fuel outlet conduit 36' at the bottom of the reservoir. This gaseous fuel outlet conduit 48a' functions in the same manner previously described for the gaseous fuel outlet conduit 48a from the separate gaseous fuel storage reservoir 46', and the liquid fuel conduit 36' functions in the same manner as the liquid fuel conduit 36 from the separate liquid fuel storage tank 34 previously described. Because the reservoir 140 is under pressure, no fuel pump is required for the liquid fuel. However, because the pressure varies according to the ambient pressure, a pressure regulator 142 is preferably provided on the liquid fuel outlet conduit 36'.

Of course, the portion of gaseous fuel in combined storage reservoir 140 that is in the liquid phase may mix with the liquid fuel and exit along with the liquid fuel. However, since as both fuels are consumed, they separate.

The combined storage reservoir may be constructed with a primary compartment "A" and a secondary compartment "B", connected together in the same manner as previously described for the two compartment embodiment of the gaseous fuel storage reservoir. The two compartment combined storage reservoir will function in the same manner described for the various embodiments of the two compartment gaseous fuel storage reservoir 46' (and 46", etc.).

4. Gaseous Fuel Controller

Figure 14:
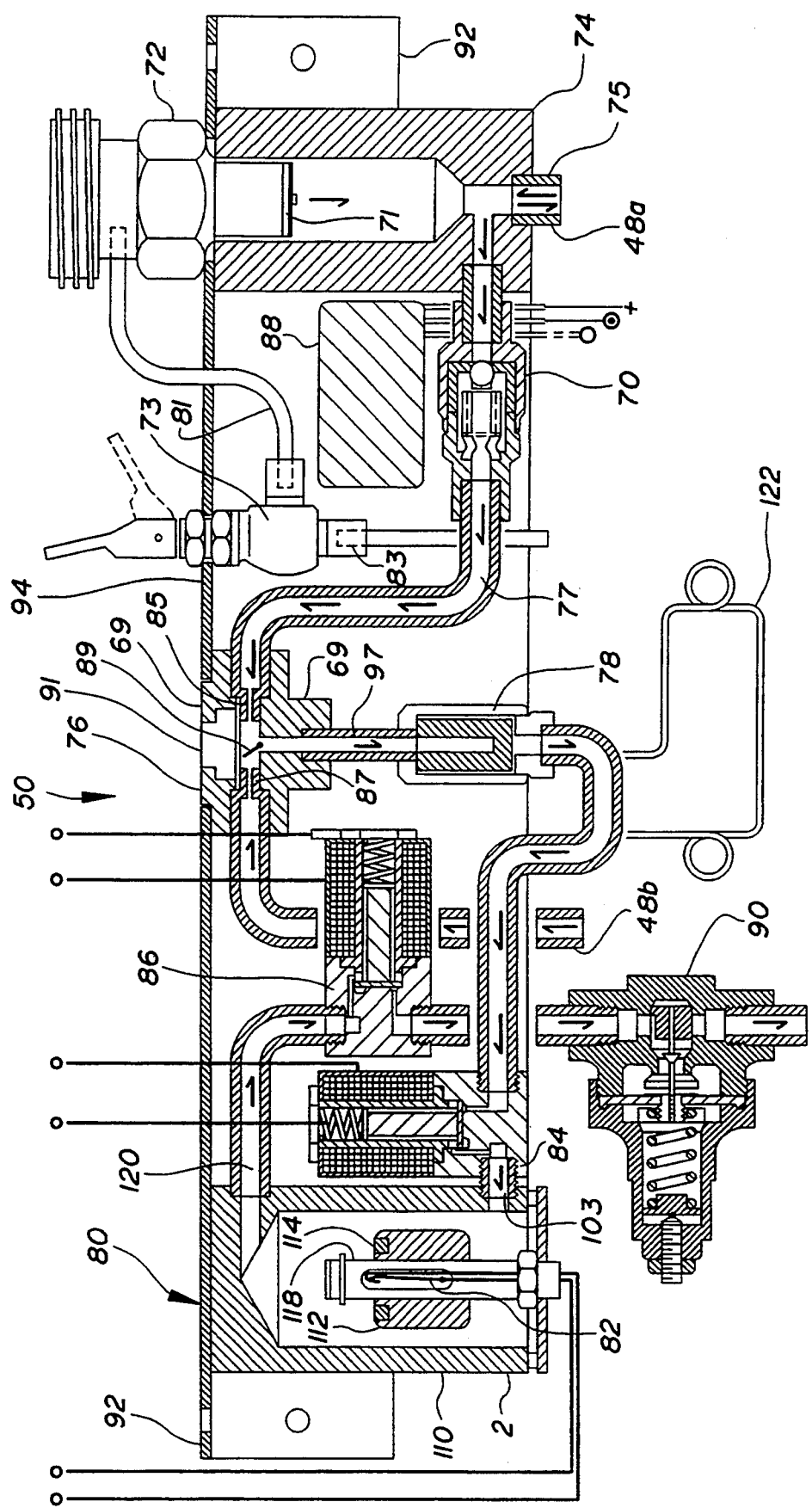
FIG. 14 depicts a sectional side view of an integrated gaseous fuel control system in accordance with the present invention.

With reference now to FIG. 14, in the present invention, the flow of gaseous fuel delivered from the storage reservoir to the air intake manifold of the engine is preferably controlled by means of an integrated gaseous fuel controller 50. In accordance with a preferred embodiment of the present invention, gaseous fuel controller 50 includes a fill connection 72, a fill vent valve 73, a vacuum preventing check valve 70, an indicator device 76 for indicating whether gaseous fuel is flowing from the secondary compartment of a dual compartment gaseous fuel storage reservoir, a gaseous fuel filter 78, a synergizer 80 and its associated magnetic switch 82 and solenoid valve 84 on its inlet, a solenoid valve 86 on the gaseous phase conduit from the synergizer, electric controls 88, a pressure regulator 90, as well as the various conduits interconnecting these components and the fittings required for connection to conduits leading from the gaseous fuel reservoir to the intake manifold of the engine.

In the preferred embodiment, all of these components of the gaseous fuel controller 50 are integrated together on a common bracket 92 and (with the exception of regulator 90) preferably housed within a common housing 94, as shown in FIG. 14. In this way, these components can be factory assembled and tested, and then installed on the vehicle as a unit. This provides for improved reliability and safety, and greatly simplifies retrofit installation of the dual fuel system of the present invention on an existing vehicle.

The design and operation of the various components of gaseous fuel controller 50 are described below.

a. Fuel Fill

Fuel fill connection 72 is preferably the industry standard 1 and ¾ inch, double checked, A.C.M.E. fuel fill. This fuel fill is approved for vehicles and fork-lift trucks, among others.

In currently available LPG powered vehicles, and in prior art dual fuel vehicles, the LPG fuel fill is located in the rear of the vehicles above the rear bumper. In the event of a rear collision, this fill location could potentially cause a dangerous situation.

In the present invention, the gaseous fuel fill connection is placed in a location that will be protected by the existing vehicle's structure. As depicted in FIG. 1, the gaseous fuel controller 50 (including fuel fill connection 72) is located in the engine compartment behind the vehicle's front axle and inward of the front tires and suspension. Therefore, the fuel fill 72 achieves protection from front and side collisions and does not to interfere with the vehicle's exterior appearance.

The upper portion of connection 72 is threaded for attachment of a filling nozzle (not shown) during filling and for a protective plastic cap (not shown) when not filling. The lower portion of connection 72 includes the double check valve 71 and is threaded into a gaseous fuel manifold block 74.

Gaseous fuel manifold block 74 includes a connection 76 to a conduit leading to compartment "A" of the gaseous fuel reservoir 46, and a "Tee" connection leading to spring loaded check valve 70 for preventing the formation of a vacuum in the gaseous fuel reservoir 46, as previously described. Check valve 70 is connected to a conduit 77 leading to one inlet of indicator device 76.

b. Vent

In current propane conversions, the fueling operator is sprayed with propane fuel left in the filling nozzle when the filling nozzle is removed. To prevent this, the gaseous fuel controller 50 of the present invention includes a toggle or push button operated valve 73.

The inlet 81 of valve 73 is connected by a conduit to the upper portion of fill connection 72, above the double check valve and below the threaded connection for the filling nozzle. The outlet 83 is connected to a conduit leading to an vent to the atmosphere, remote from the engine compartment.

After filling, but before removal of the fill nozzle, the operator actuates valve 73 to vent the propane fuel from the fill nozzle, through the vent line leading to the bottom of the vehicle, and thence to the atmosphere. In this way, the fueling operator and engine are not sprayed with LPG when the nozzle is removed. In lieu of venting to the atmosphere, this valve could be connected to a fuel recovery system that would take this used fuel back into either the storage reservoir 46, or a separate fuel recovery system, and thus not pollute the environment.

Eliminating the release of gaseous fuel as the fill nozzle is unscrewed eases filling nozzle removal, increases customer satisfaction, and allows the gaseous fuel fill to be located in the vehicle's engine compartment.

c. Quick-Connect Fill Connection

To improve the fueling of the gaseous fuel reservoir 46, a alternate means has been developed utilizing a quick-connect fill connection 72' that would not involve a release of fuel at disconnect and the safety concerns associated with such a fuel release. Quick-connection fill connection 72' may be used for LPG, natural gas, or other gaseous fuels.

Figure 18:
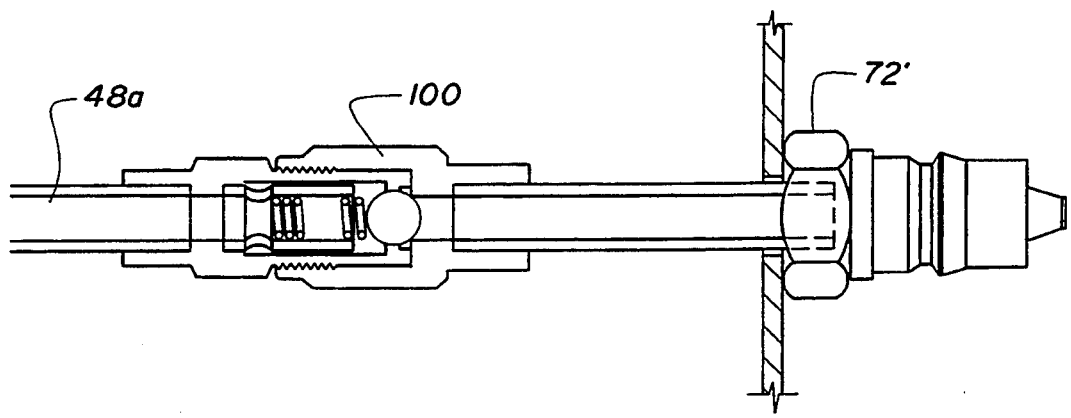
FIG. 18 is a side sectional view of a male quick-connect fill connector back up check valve in accordance with the present invention.
Figure 20:
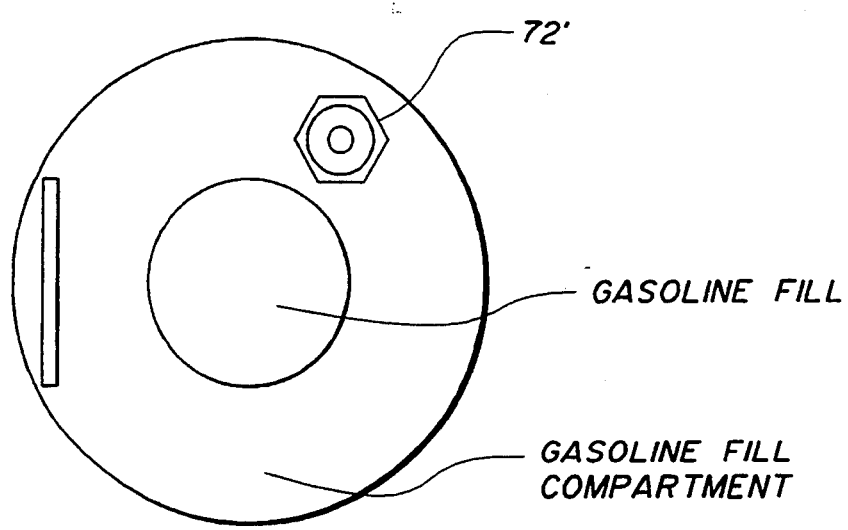
FIG. 20 is a side view of a possible mounting location adjacent the gasoline fuel fill for the male quick-connect fill connector in accordance with the present invention.
Figure 21:
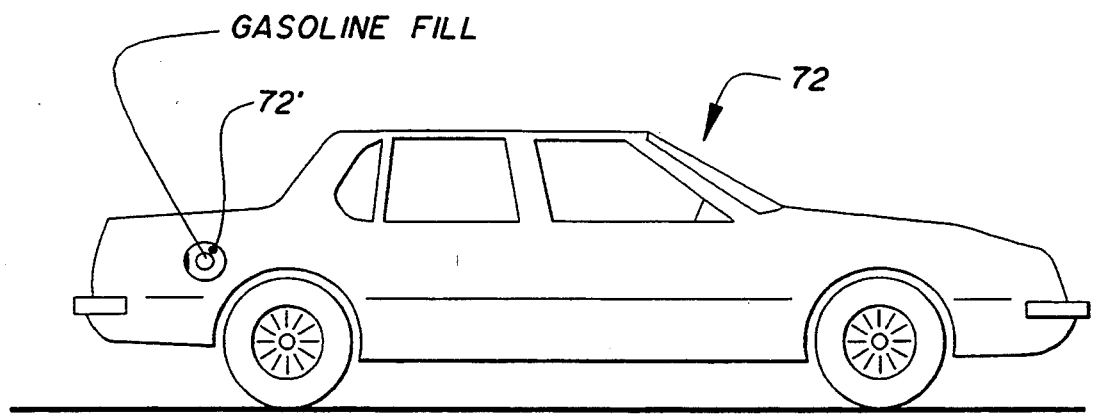
FIG. 21 is a side view of a dual fuel vehicle depicting the location of the male quick-connect fill connector in accordance with the present invention at the rear side of the vehicle.

With reference to FIG. 18, male quick-connect fill connection 72' includes a fuel line 48a leading to gaseous fuel reservoir 46, a check valve 100, and a short conduit leading to the male quick-connect fill connector 72'. Quick-connect fill connection 72' may be located on the vehicle adjacent to the vehicle's existing gasoline fill, as depicted in FIGS. 20 and 21.

Figure 19:
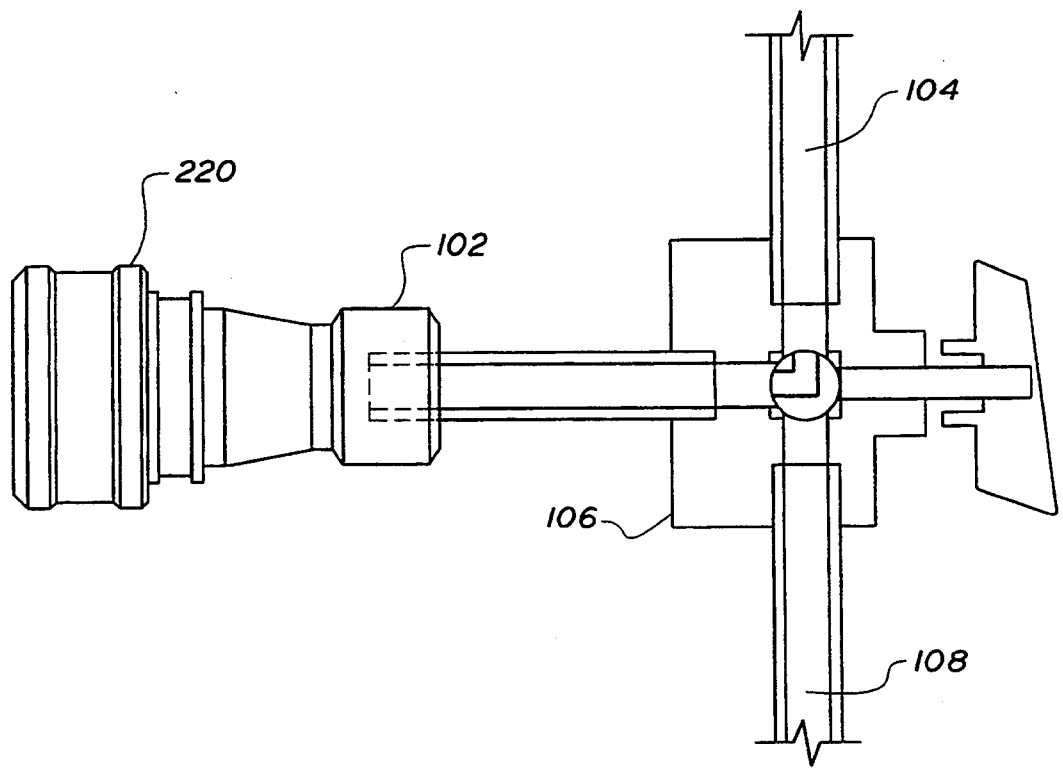
FIG. 19 is a side sectional view of a female quick-connect fill nozzle in accordance with the present invention.

Male quick-connect fill connection 72' is adapted to interfit with a female quick-connect filling nozzle 102 depicted in FIG. 19. Filling nozzle 102 includes a conduit 104 leading to a supply of gaseous fuel, a three-way valve 106 and a vent conduit 108.

The female quick-connect fill nozzle 102 is attached to the male quick-connect fill connector 72' with a lock-ring connection having a spring loaded lock-ring 220. Pushing the male and female quick-connect connectors together locks them together and seals them. Moving lock-ring 220 down unlocks the connectors from one another. When the female nozzle 102 is connected to the male connector 72', three-way valve 106 must be turned to vent conduit 106.

When the female quick-connect fill nozzle 102 is connected to male connector 72', gaseous fuel flows from the source of gaseous fuel, through fuel line 104 to the three-way valve 106 that controls the flow of fuel. The gaseous fuel then passes through the three-way valve 104, into the female quick-connect fill nozzle 102, and then into the male quick-connect fill connection 72', which contains an integral check valve, through check valve 100, to fuel line 48a.

When fueling is complete the three-way valve 106 is turned to vent conduit 108, to vent the amount of fuel remaining in the female quick-connect nozzle 102. If fuel conduit 108 is not vented, the female nozzle 102 cannot be removed. Vent conduit 108 could also be connected to a fuel recovery system that would take this used fuel back into the source of the gaseous fuel, and thus not pollute the environment.

The foregoing quick-connect fill male and female nozzles are also useful in the interchangeable gaseous fuel storage reservoir of the present invention, to be described below.

d. Compartment Indicator

Indicating device 76 indicates if liquid LPG fuel is present in compartment "B" of the two compartment fuel reservoir. The purpose of indicating device 76 is to indicate to the refueling operator not to refuel compartment "A" if any fuel has been vented into compartment "B" due to the thermal expansion of the liquid fuel in compartment "A". Indicator 76 includes a pressure containing body 69, a compartment "A" orifice nozzle 85, a compartment "B" orifice nozzle 87, a pivoted flag 89 having one red side and one green side, and a sight glass 91.

Figure 10:
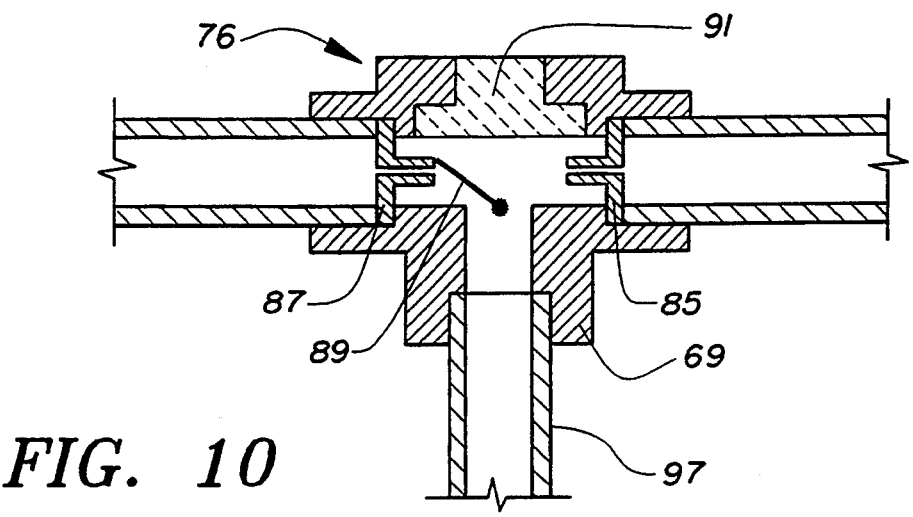
FIG. 10 is a side sectional view of the indicating device for indicating whether gaseous fuel has been discharged from the relief compartment of the dual compartment storage reservoir in accordance with the present invention.
Figure 11:
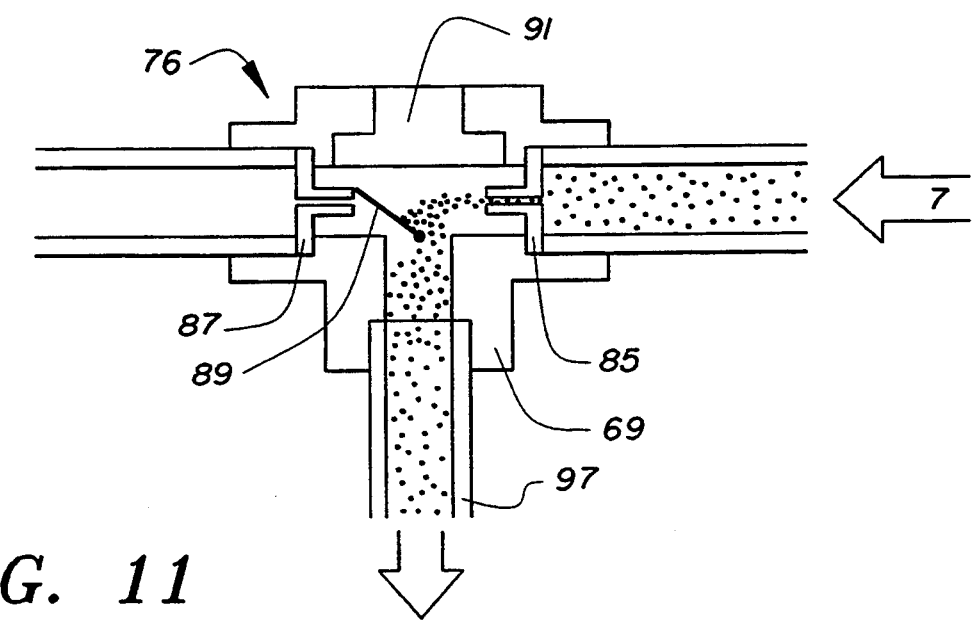
FIG. 11 is a schematic side sectional view of the indicating device depicted in FIG. 10, showing the operation of the indicating flapper when there is a gaseous discharge from the main compartment of the dual compartment storage reservoir in accordance with the present invention.
Figure 12:
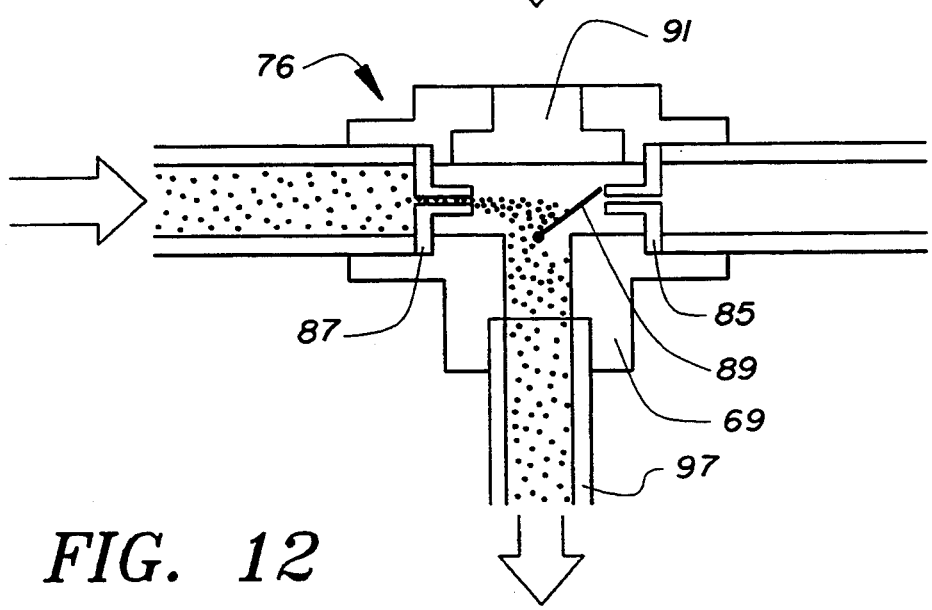
FIG. 12 is a schematic side sectional view of the indicating device depicted in FIG. 10, showing the operation of the indicating flapper when there is gaseous discharge from the relief compartment of the dual compartment storage reservoir in accordance with the present invention.

With reference to FIGS. 10 to 12, the operation of indicating device 76 will be described. As shown in FIG. 11, when fuel from compartment "A" of the gaseous fuel reservoir flows the right inlet of indicator 76, it passes through the compartment "A" orifice nozzle 85. The spray of the fuel flips the pivoted flag 89 in indicator 76 so that the green side is visible through sight glass 91.

Since the outlets of compartments "A" and "B" include spring loaded check valves causing fuel in compartment "B" to be used first, if fuel is present in compartment "B" of the gaseous fuel reservoir 46, fuel will flow from compartment "B" through compartment "B" orifice nozzle 93. As shown in FIG. 12, in this case, the spray of the fuel flips the flag to the red side.

Whether the gaseous fuel comes from compartments "A" or "B", as depicted in FIGS. 11, 12 and 14, the gaseous fuel that enters indicating device 76 exits through outlet 97 leading to gaseous fuel filter 78.

Returning now to FIG. 14, after passing through gaseous fuel filter 78, the gaseous fuel enters the inlet of solenoid valve 84, and then to the lower inlet 103 of synergizer 80, the operation of which will be described subsequently.

Thus, by viewing the flag through the sight glass 91, the operator can see that there was fuel in compartment "B" when the engine was last run. This means that compartment "A" must have been full, indicating to the operator that compartment "A" should not be filled until the fuel in compartment "B" is first consumed.

A typical gaseous fuel filling operation with the present invention would be effected as follows.

1. Confirm indicator at fill is green. If indicator is red do not attempt to refuel or "top-off".
2. Remove plastic cap on filler valve and connect filling nozzle.
3. Turn on pump. Slowly open hose end of valve on filling nozzle.
4. Fill reservoir until it is completely full of liquid LPG fuel, and close hose nozzle end valve.
5. Push downward on the lever of the valve at fill valve to vent volume of LPG fuel contained in the nozzle. Hold valve open until the sound of air turbulence ends, about 15 to 20 seconds.
6. Disconnect filling nozzle.
7. Replace plastic cap on filler valve.

e. Synergizer

LPG fuel can be stored and delivered in either a vapor state (gaseous phase) or liquid state (liquid phase). The differing angles and sloshing of LPG fuel in a horizontal reservoir make it difficult to always assure a single phase of the LPG (i.e. either all liquid phase or all gaseous phase) is delivered through fuel line 48a or 46b from gaseous fuel storage reservoir 46. Thus, it is possible that, at times, a mixed phase flow of gaseous LPG and slugs of liquid state LPG will be transported through the fuel lines from the storage reservoir. This creates the possibility of uncontrolled, abrupt changes in the flow rate of the gaseous fuel to the engine.

Figure 15:
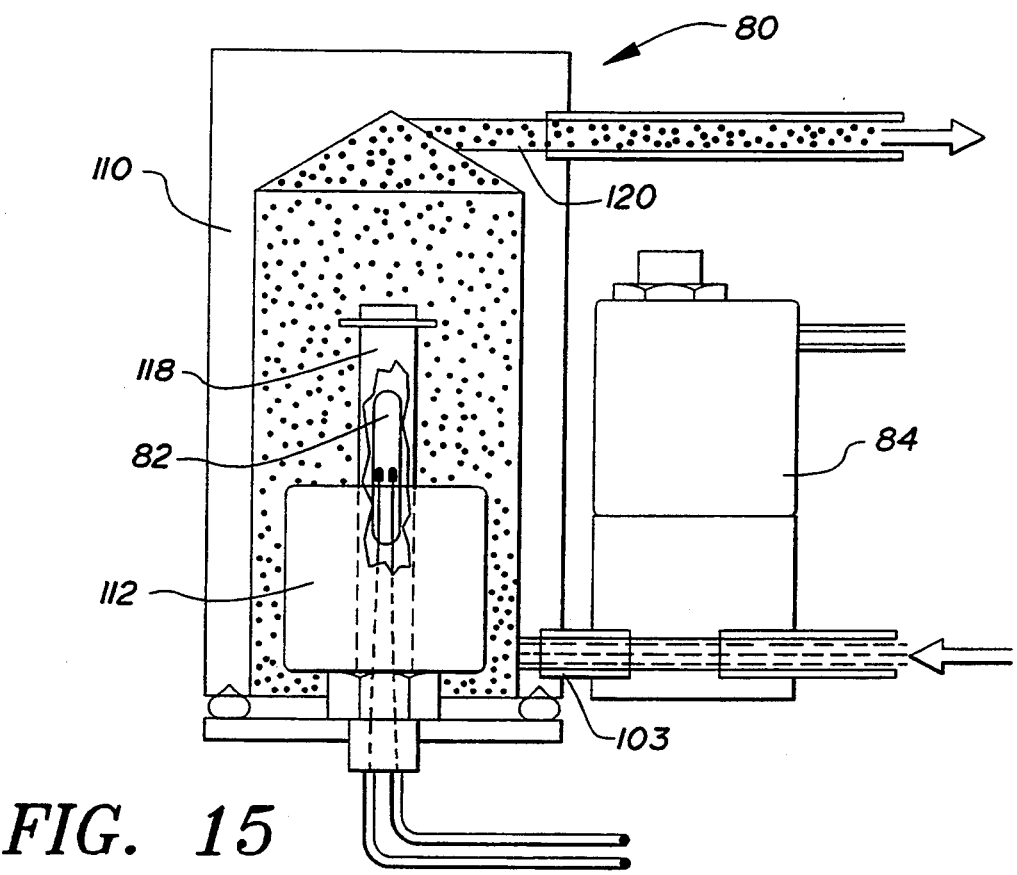
FIG. 15 schematically depicts the operation of the gaseous fuel synergizer in accordance with the present invention when there is a low liquid level.
Figure 16:
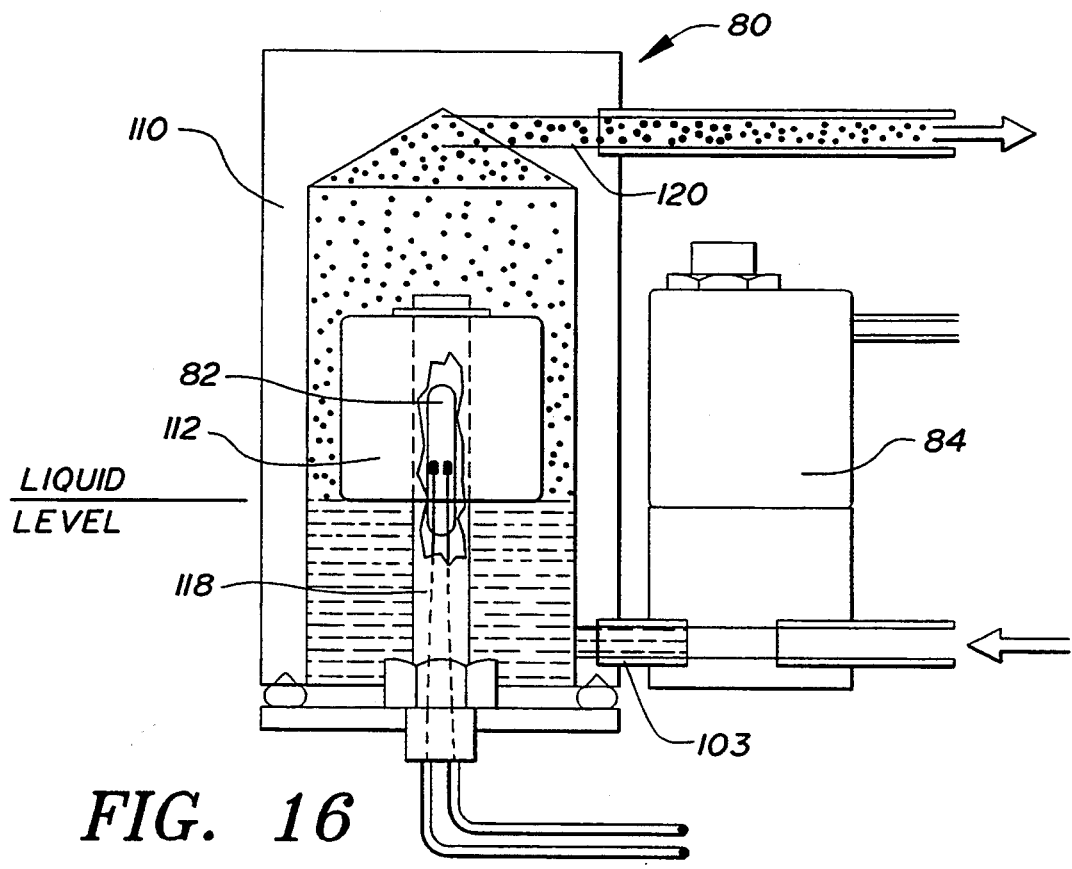
FIG. 16 schematically depicts the operation of the gaseous fuel synergizer in accordance with the present invention when there is a high liquid level.

In order to obtain fuel of the same consistency in a vaporized state, the present invention incorporates a device which will herein be referred to as a synergizer 80, depicted in FIGS. 14–16. Synergizer 80 accomplishes this purpose without the need for separate heating of the fuel.

Synergizer 80 includes a hollow pressure containing body 110 holding a float 112. Float 112 is free floating and includes a magnet 114 for actuating magnetic switch 82. Magnetic switch 82 is contained in interior slide tube 118, which is closed at its upper end so that its interior (containing the magnetic switch 82) is sealed from the gaseous fuel. Of course, other proximity switches, such as, for example, a capacitance switch, a Hall effect switch, or an optical switch may also be employed.

The pressure containing body or container 110 includes a lower portion capable of holding a quantity of liquid LPG and an upper portion intended to be filled with gaseous LPG and be substantially free of liquid LPG. The lower portion includes the inlet 103 for receiving a gaseous, liquid, or possibly mixed phase, flow of LPG.

Solenoid valve 84 is mounted on inlet 103, and its actuating coil is controlled by magnetic switch 82. As shown schematically in FIG. 15, when there is only a small amount of liquid LPG in the body 110, the float 114 falls, switching magnetic switch 82 off. This causes solenoid valve 84 to open, permitting gaseous, liquid or mixed phase LPG to flow into body 110. As shown schematically in FIG. 16, when the amount of liquid LPG in the body 110 rises sufficiently, the float 114 rises to the point where it causes magnetic switch 82 to switch on. This causes solenoid valve 84 to close.

The liquid phase of gaseous fuel in the lower portion of synergizer 80 converts to vapor before more fuel is allowed to enter. If fuel in a gas phase passes through the synergizer, the float does not activate and the solenoid does not turn off the flow of fuel. The interior volume of the body 110 has been designed to allow the liquid fuel at the preset liquid level to vaporize as per the natural vaporization of LPG fuel in the amount required for engine operation.

The upper portion of body 110 includes an outlet 120 for permitting exit of gas phase LPG. Thus, the synergizer ensures that, regardless of the condition of LPG in the fuel line from gaseous fuel storage reservoir 46, the LPG delivered to the engine will always be dry vapor.

In the case where the combined storage reservoir 140 is used, a small amount of liquid fuel may, from time to time, exit with the gaseous fuel through the gaseous fuel conduit 48a'. If this occurs, this liquid fuel will be adequately separated from the gas phase gaseous fuel in synergizer 80 in the same manner as previously described for the liquid phase of gaseous fuel from the gaseous fuel storage reservoir 46 (and 46', 46", etc.), leaving the liquid fuel in the bowl 110. After a period of time, any small amount of liquid fuel in bowl 110 of synergizer 80 will eventually evaporate inside the bowl, and will exit as a vapor along with the gas phase of the gaseous fuel, in the manner previously described.

The interior volume of the synergizer body 110 is also sized according to the heat of vaporization at the ambient engine compartment temperature. Synergizer body 110 acts as a heat sink, absorbing and distributing the ambient engine compartment temperature to aid in vaporization of the LPG fuel.

Thus, it has been found quite surprisingly that the synergizer requires no heat exchanger or other direct heating. This is a dramatic improvement over current LPG fueled vehicles, which typically require a large vaporizer connected to the vehicles radiator, and associated complex piping. The elimination of the need for a heat exchanger greatly simplifies the installation of the dual-fuel system of the present invention, particularly for retrofit applications.

Figure 13:
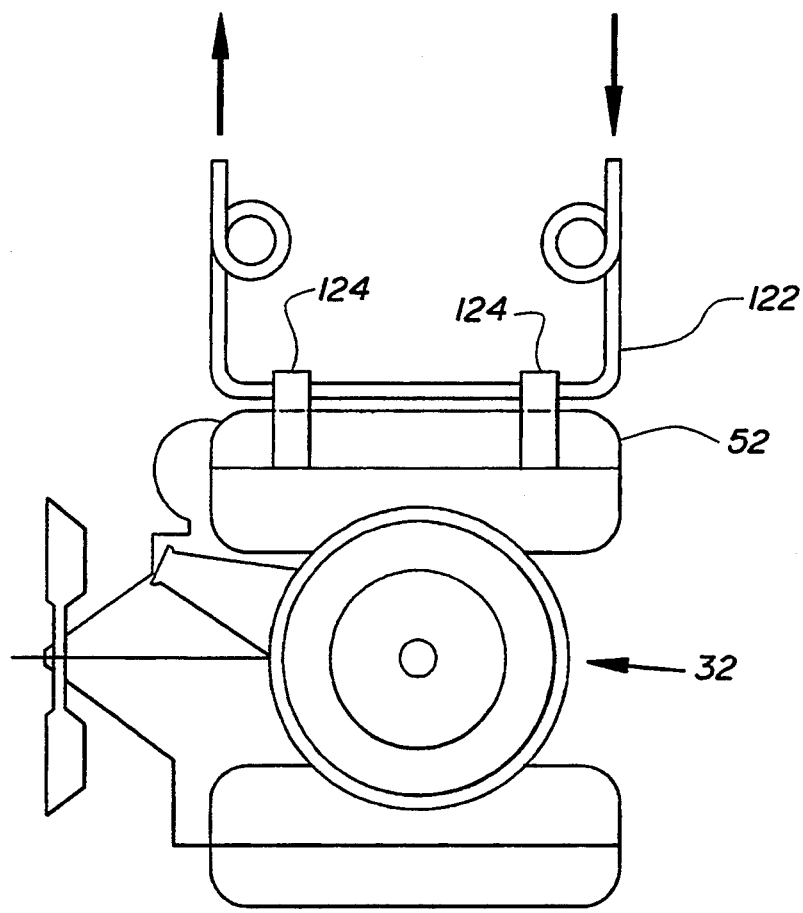
FIG. 13 depicts a gaseous fuel pre-heater in accordance with a preferred embodiment of the present invention, mounted on an exhaust manifold of an internal combustion engine.

It should also be noted that the present invention does not preclude the use of a preheater. FIG. 13 shows a preheater 122 in accordance with the present invention, which consists simply of a loop of tubing having expansion coils at each end. As depicted in FIG. 14, preheater 122 is preferably located upstream of solenoid 84, but it may be located in other places.

Preheater 122 is mounted on the exhaust manifold of engine 32 through heat transfer mounts 124. Any other hot portion of the engine may also be used. Heat from the exhaust manifold is transmitted through mounts 124 to the tubing of preheater 122, imparting heat to the LPG fuel, aiding vaporization. Instead of directly mounting the preheater 122 to the exhaust manifold, the preheater can simply be mounted in contact with it or nearby, so as to receive radiant heat. In this case, a radiant heat transfer plate is preferably added to the tubing to better absorb the radiant heat.

The gaseous outlet 120 of synergizer 80 leads to solenoid valve 86, which is controlled by electric controls 88. Controls 88 receive an input indicating whether or not the engine is running such as from the oil pressure switch, alternator output voltage, engine control computer output, vacuum switch, etc. An input which indicates whether or not the engine is running substantially instantaneously, such as detecting the electrical output of the alternator, is preferred over a slower acting mechanical input, such as the oil pressure switch. Controls 88 are arranged such that, unless such an input is present (indicating that the engine is operating), solenoid valve 86 will remain closed. This prevents flow of gaseous fuel from starting until the engine is actually running, and cuts off the flow of gaseous fuel in the event of engine stalling.

The outlet of solenoid 86 leads to a pressure regulator 90, the purpose of which is to maintain substantially constant pressure in the downstream side of the regulator, leading to the intake manifold of the engine. At the intake manifold of the engine, there is a restricting orifice in the gaseous fuel line. This, coupled with the pressure regulator 90, causes the flow rate of gaseous fuel into the intake manifold to stay substantially constant, regardless of engine load.

Preferably, all components are constructed of materials that resist the chemical reactions and pressures of the gaseous fuels.

f. Operation

In the dual or multi fuel system of the present invention, electronic fuel delivery controller 42 is used to control the liquid fuel delivery without changes. However, the present invention takes great advantage of electronic fuel delivery controller 42 to facilitate adaptation of a vehicle to operate on both liquid and gaseous fuels, particularly when retrofitting an existing liquid fuel only vehicle.

It has been discovered that in vehicles having an electronic fuel delivery controller 42 and exhaust gas sensor 48, when gaseous fuel is delivered, liquid fuel delivery controller 42 will automatically decrease the amount of liquid fuel delivery to appropriately compensate for whatever amount of gaseous fuel is being delivered. This fact simplifies adaptation of an existing liquid fuel vehicle to operate simultaneously on liquid fuel and a gaseous fuel. The present invention permits installation of the dual fuel system without any modification of the existing vehicle's emission or fuel systems on vehicles having computer controlled liquid fuel delivery system vehicles, such as, for example, electronically fuel injected vehicles. Thus, installation of the system is in full compliance with United States Government Clean-air Legislation.

When gaseous fuel is first supplied to the air intake, sensor 58 will first sense the slight decrease in the completeness of combustion, and fuel delivery controller 42 will immediately reduce the amount of liquid fuel delivery to compensate for this. Thus, providing that the flow rate of the gaseous fuel does not change too abruptly for the electronic fuel delivery controller 42 to respond, gaseous fuel may be injected into the air stream leading to the cylinders without the need for separate control of the amount of gaseous fuel and independently of engine conditions.

It has been found that preferred and advantageous operation of the internal combustion engine is achieved when the gaseous fuel is injected into the air stream at a substantially constant gas flow rate, independent of engine conditions or the rate of air flow into the engine. Substantially constant flow rate of the gaseous fuel is conveniently achieved by means of a conventional pressure regulator 90 and the restricting orifice disposed between pressure regulator 90 and the intake manifold.

Of course, use of a constant gaseous fuel flow rate causes a high ratio of gaseous fuel to liquid fuel at idle (when liquid fuel delivery is at a minimum), and a low ratio when the engine is under full load (when liquid fuel delivery is at a maximum while gaseous fuel injection remains constant). The gaseous fuel is used only to heat the liquid fuel in order to vaporize the liquid droplets. Very little power comes from the BTU gaseous fuel. The power comes from the liquid fuel which burns completely at the time of ignition. Only minor proportions of gaseous fuel are required to achieve the synergistic effect of improving the completeness of combustion of liquid fuel. Accordingly, the optimum combination of improved fuel economy, reduced emissions and lower maintenance, and increased range is believed to result from a substantially constant rate of flow of gaseous fuel.

The optimum gaseous fuel flow rate to be selected for a given application depends upon such factors as the type of engine, expected operating conditions for the engine. However, preferably the constant gaseous fuel flow rate will be in the range of an amount corresponding to that needed to vaporize the liquid fuel sufficiently to obtain the drsirable synergistic effects on improving the completeness of combustion of the liquid fuel and to minimize undesirable emissions. A cut off of liquid fuel at idling reduces the idling power, consuming an increased amount of lower BTU gaseous fuel. However, as liquid fuel is increased, the gaseous fuel will vaporize by heating the liquid fuel.

Preferably, at idle, there is very little liquid fuel being delivered to the engine, but the amount delivered is of very high efficiency.

Operating engines equipped with the dual or multi fuel system of the present invention does not differ from that of any previously operating gasoline powered engine. The engine is started using the existing gasoline fuel only to ensure no pooling of gaseous fuels in the event of engine stalling during engine starting.

Upon engine operation (as determined by the presence of oil pressure, alternator output, or the like), solenoid valve 84 opens, permitting flow of gaseous fuel into the engine's air supply. In the event of the vehicles stalling, solenoid valve will close, automatically turning off the supply of gaseous fuel.

In response to the output of sensor 58, the engine's existing electronic fuel delivery controller 42 automatically controls the amount of liquid fuel delivery to ensure complete combustion, thus automatically reducing the amount of liquid fuel delivery by an appropriate amount to compensate for the presence of the gaseous fuel.

If the vehicle's engine is stopped, whether the ignition key is on or off, the gaseous fuel is sealed off by means of a two-stage double check valve (not shown).

In the event of total consumption of the stored gaseous fuel, the engine's electronic fuel delivery system automatically adjusts the amount of liquid fuel delivery to compensate, such as by adjusting the injection cycle of the liquid gasoline fuel. In the carburetor vacuum system, a mechanical pot increases the liquid fuel. Thereby the vehicle operator does not need to make any adjustments since the engine performs this task itself automatically.

D. Reservoir Usage Gauge

With the horizontal storage reservoir of the present invention (and, indeed, with many other LPG storage reservoirs) accurate direct fuel level measurement of LPG is impractical using conventional methods such as a float mechanism. This is because a horizontal reservoir mounted in a vehicle may assume differing angles during operation. Also, sloshing of LPG within the reservoir may occur due to motion of the vehicle.

Figure 22:
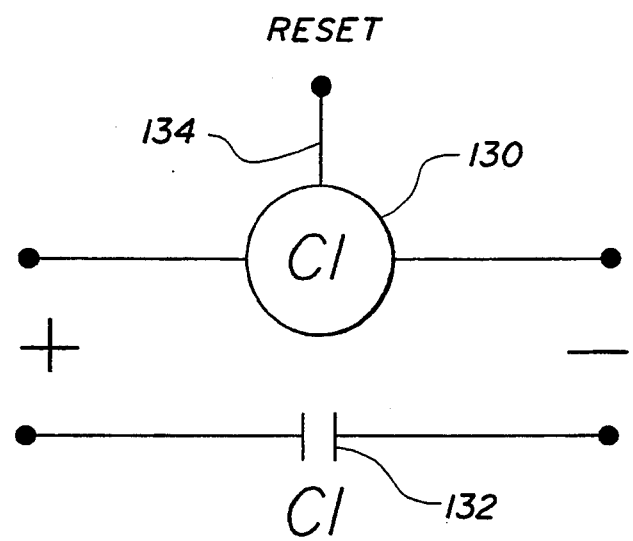
FIG. 22 is an electric diagram of the gaseous fuel storage gauge in accordance with the present invention.
Figure 23:
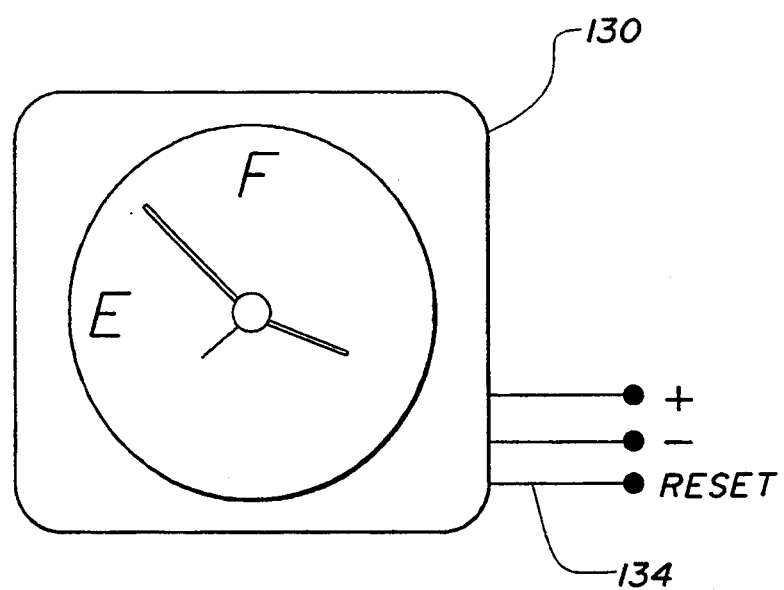
FIG. 23 depicts the indicating face of an embodiment of the gaseous fuel storage gauge in accordance with the present invention.

With reference now to FIG. 22 and 23, an indirect, but accurate, reservoir usage gauge will be described. In accordance with the present invention, a clock 130 is used to indirectly measure the amount of LPG fuel remaining. Clock 130 includes a relay 132 electrically connected to the input of the actuating solenoid of solenoid valve 84 and includes a manual reset 134. Of course, is shown in FIG. 23, clock 130 need not have a face indicating time, but may have a face indicating "E" for empty and "F" for full. It may also have a face indicating the number of gallons of gaseous fuel used, or the like.

Clock 130 is reset to zero at the time of fill-up of LPG fuel. Whenever solenoid valve 84 is open, i.e., when gaseous LPG fuel is being delivered into the intake manifold, clock 130 measures the elapsed time. When solenoid valve 84 is closed, clock 130 is stopped.

Since gaseous fuel flows into the intake manifold at a substantially constant rate for a particular vehicle while the engine is operating, regardless of engine operating conditions, the rate of fuel usage is a direct function of time. If the fuel reservoir is filled to maximum capacity at each fueling, then the measure of fuel usage becomes simply a measurement of elapsed time. Additionally, an alarm function of the clock can serve as a low fuel warning device notifying the vehicle operator of pending low fuel condition.

It should be noted, however, that no serious inconvenience results even if the LPG fuel were to be unexpectedly used up. In this event, the engine would simply continue to run adequately on the liquid fuel alone. However, the beneficial effects of the addition of gaseous fuel would not be available until the LPG fuel was replenished.

E. Method for Non-Mechanical Transfer of Gaseous Fuel

Currently the transfer of LPG fuel from an external storage reservoir (such as that used by the LPG fuel company) to a storage reservoir used with an internal combustion engine is achieved through the means of a mechanical pump.

It has been found that LPG, or other gaseous fuel, can be transferred without utilizing mechanical means. LPG under pressure is maintained at the saturation pressure, i.e., the pressure of saturated LPG vapor at that temperature. By heating the external LPG storage reservoir (i.e., the source of LPG fuel), such as by bathing it in a bath of inert water at a temperature greater than the ambient temperature (at which the LPG fuel in the gaseous fuel storage reservoir 46 of the vehicle is stored) the internal pressure of external storage reservoir rises above the pressure of gaseous fuel storage reservoir 46, thus causing the fuel to transfer under pressure to gaseous fuel storage reservoir 46, without the need for a mechanical pump.

F. Interchangeable Gaseous Fuel Storage Reservoir System

Figure 25:
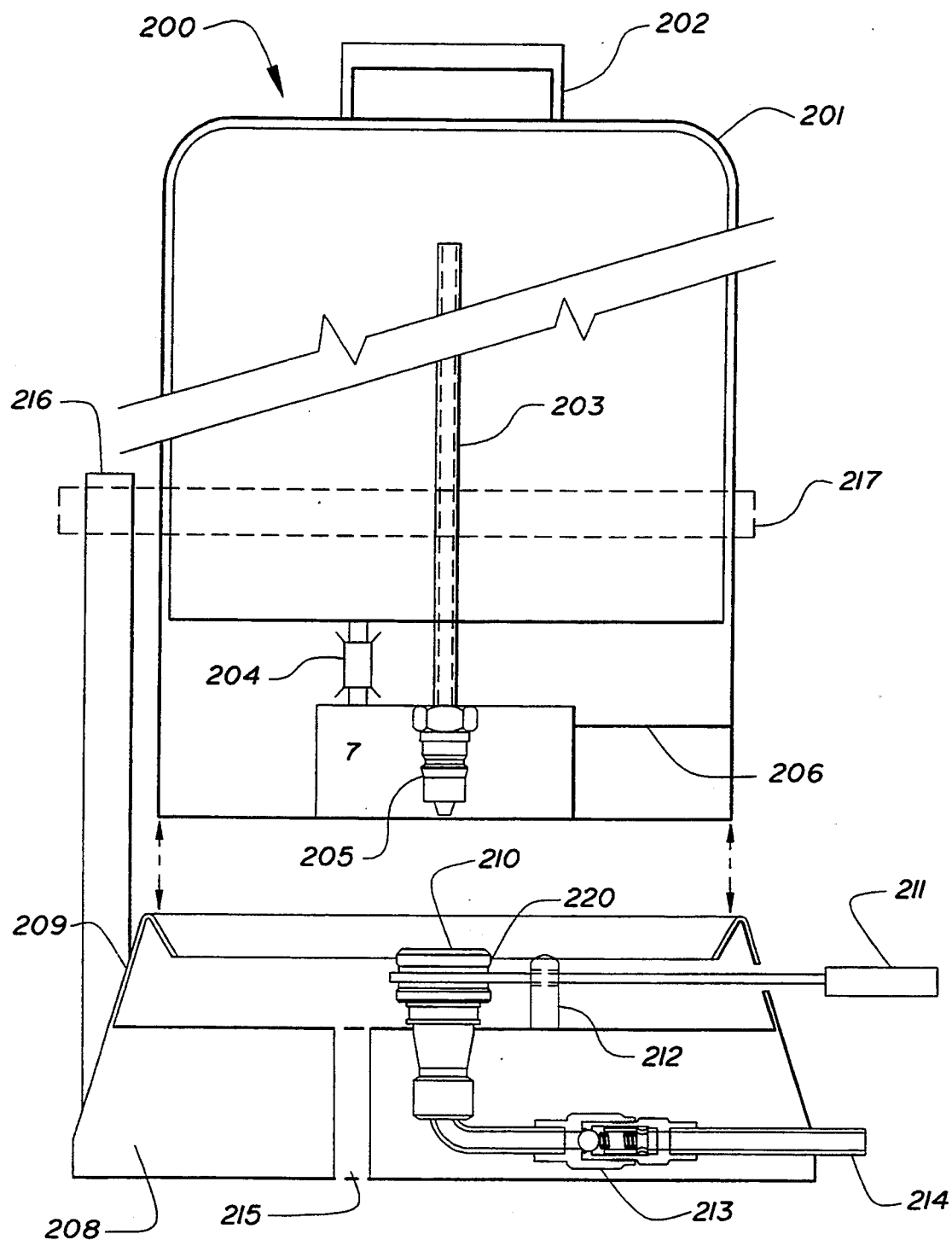
FIG. 25 depicts an elevation view, partly in section, of a vertical embodiment of an interchangeable gaseous fuel storage reservoir in accordance with the present invention, positioned just above its mounting base module.

With reference now to FIGS. 25 to 30, and initially to FIG. 25 thereof, an interchangeable gaseous fuel storage system 200 is depicted. This system includes a removable storage reservoir 201 and base module 208. The removable storage reservoir 201 may be removed from a vehicle and refilled remotely (or interchanged with a full storage reservoir) in lieu of refueling the storage reservoir while it is on the vehicle. Through the use of quick-connect nozzles of the type disclosed previously herein, these reservoirs can be interchanged quickly and without the release of gaseous fuels to the environment or the vehicle.

The embodiment of the interchangeable storage reservoir system 200 for gaseous fuels (or a combination of gaseous and liquid fuels) depicted in FIG. 25 has a vertical interchangeable reservoir 201 and a base module 208. The interchangeable reservoir can be filled by weight, leaving a vapor space for the expansion. The base module 208 is securely mounted to the vehicle or other mounting surface by means of a bracket support 216 and securing strap or bracket 217. The lower portion of interchangeable storage reservoir 201 is adapted to slide into the base module 208, inside the sides 209 of the base module and aligned by means of guide slot 206. Base module sides 209 help to position the interchangeable storage reservoir 201 as it is mated with the base module 208 and to secure the bottom of the reservoir. Sides 209 also form the relief compartment 207, to be described below.

To place a full interchangeable storage reservoir 201 onto the base module 208, the interchangeable storage reservoir 201 is lowered onto base module 208, until the male quick-connect nozzle 205 on the storage reservoir 201 mates with female quick-connect nozzle 210 on the base module 208. This action continues until the male quick-connect nozzle 205 has entered the female quick-connect nozzle 210 sufficiently to "click" the spring loaded lock ring 220 on the female quick-connect nozzle 210 into its locked position and to open the check valves built into each quick-connect nozzle. This allows fuel to flow from the interchangeable storage reservoir 201, through fuel tube 203 inside the reservoir 201, through the male quick-connect nozzle 205, into the female quick-connect nozzle 210 in the base module 208, through a check valve 213, and finally into gaseous fuel outlet 214. Placement of the reservoir 201 in the base module is facilitated by means of reservoir handle 202, which allows the operator to handle and correctly position reservoir 201.

To disconnect and remove the interchangeable storage reservoir 201 from the base module 208, the securing strap or bracket 217 is removed or lifted off. Then, the base module release handle 211, which is pivoted at pivot post 212, is lifted. This causes the spring loaded lock-ring 220 of the female quick-connect nozzle 210 to unlock. This action also lifts the male quick-connect nozzle 205 out sufficiently to cause the integral check valves in the quick-connect nozzles to close, sealing off the fuel supply in the storage reservoir 201 and male quick-connect nozzle in the base module 208. The reservoir 201 may then be lifted out by means of handle 202 and refilled or interchanged.

The interchangeable reservoir includes a pressure relief valve 204 to relieve excess pressure in the event of an internal pressure build-up. In the event of pressure build-up within the interchangeable storage reservoir 201, the spring loaded pressure relief valve 204 opens relieving the pressure. The pressure is relieved into relief compartment 207, which is a cavity at the bottom of storage reservoir 201. Relief compartment 207 is open to the base module 208. Base module 208 includes a relief vent 215 at its bottom, which is open to the outside atmosphere. Accordingly, the released fuel is dissipated to atmosphere by flowing through the relief compartment 207, through relief vent 215 directly (or through tubing) to the atmosphere. In this way, relief of fuel into the vehicle or other closed space is avoided.

Figure 26:
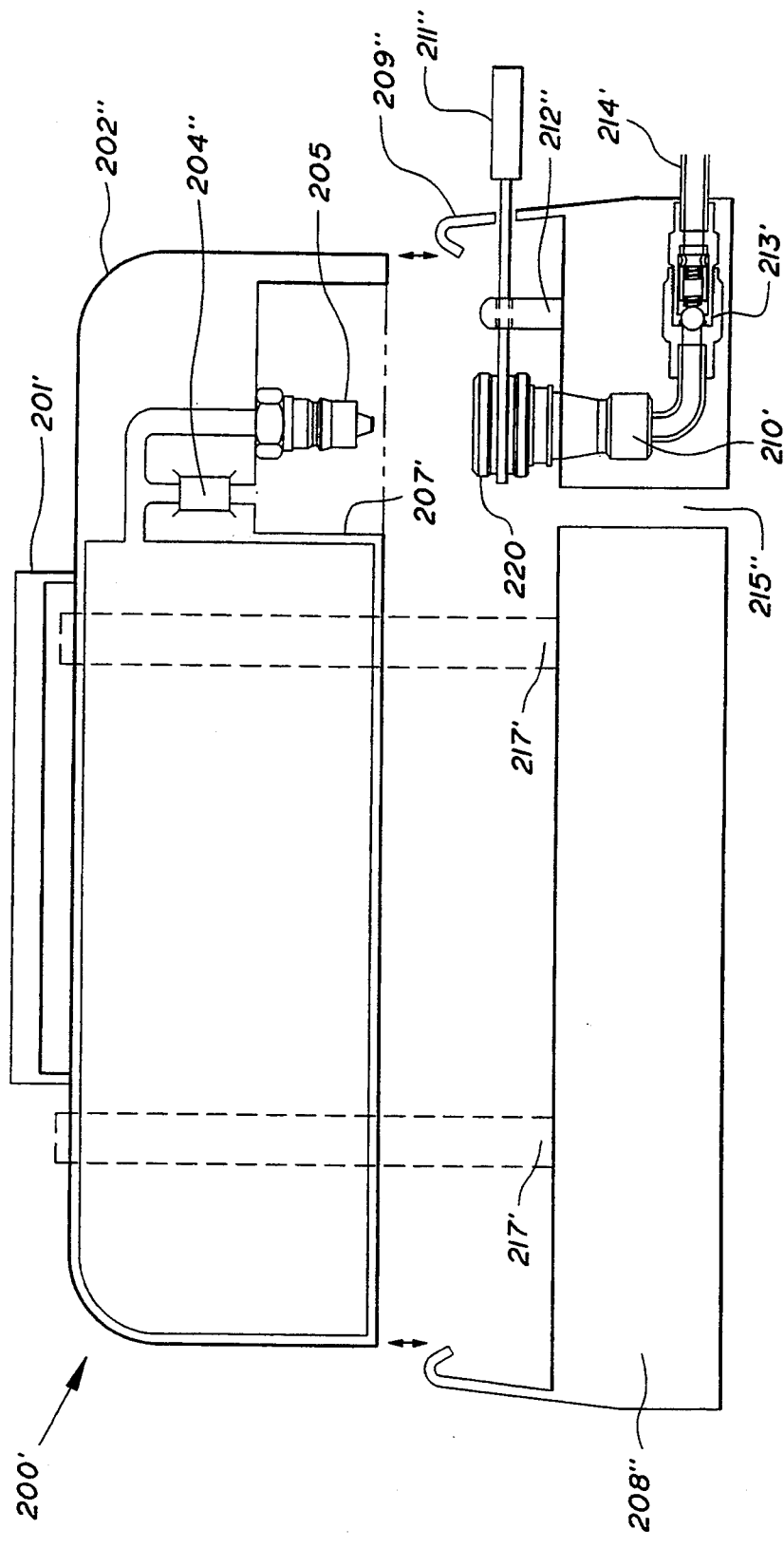
FIG. 26 depicts an elevation view, partly in section, of a horizontal embodiment of an interchangeable gaseous fuel storage reservoir in accordance with the present invention, positioned just above its mounting base module.

FIG. 26 shows an interchangeable storage reservoir system 200' that is similar in operation to that described with respect to FIG. 25, except that it includes a horizontal storage reservoir 201' instead of vertical storage reservoir 201. This design is intended for use within a vehicle trunk, passenger or cargo compartment.

Figure 27:
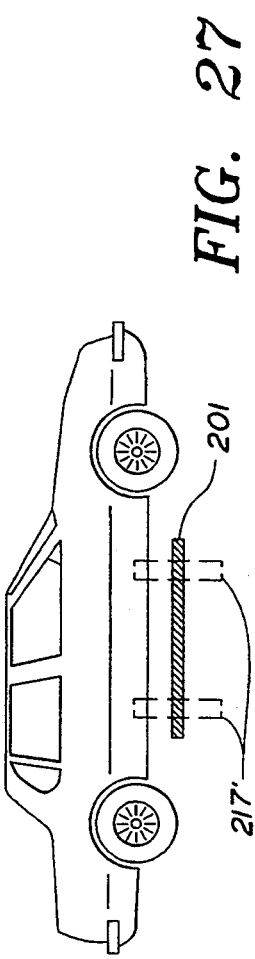
FIG. 27 depicts an elevation view of a vehicle having an interchangeable gaseous fuel storage reservoir in accordance with the present invention, mounted underneath the vehicle.

FIG. 27 shows a mounting location for an interchangeable storage reservoir 201' (or 201) in accordance with the invention, under a vehicle utilizing a flat design interchangeable fuel reservoir. The storage reservoir would be strapped or bracketed to the underside of a vehicle in any convenient manner.

Figure 28:
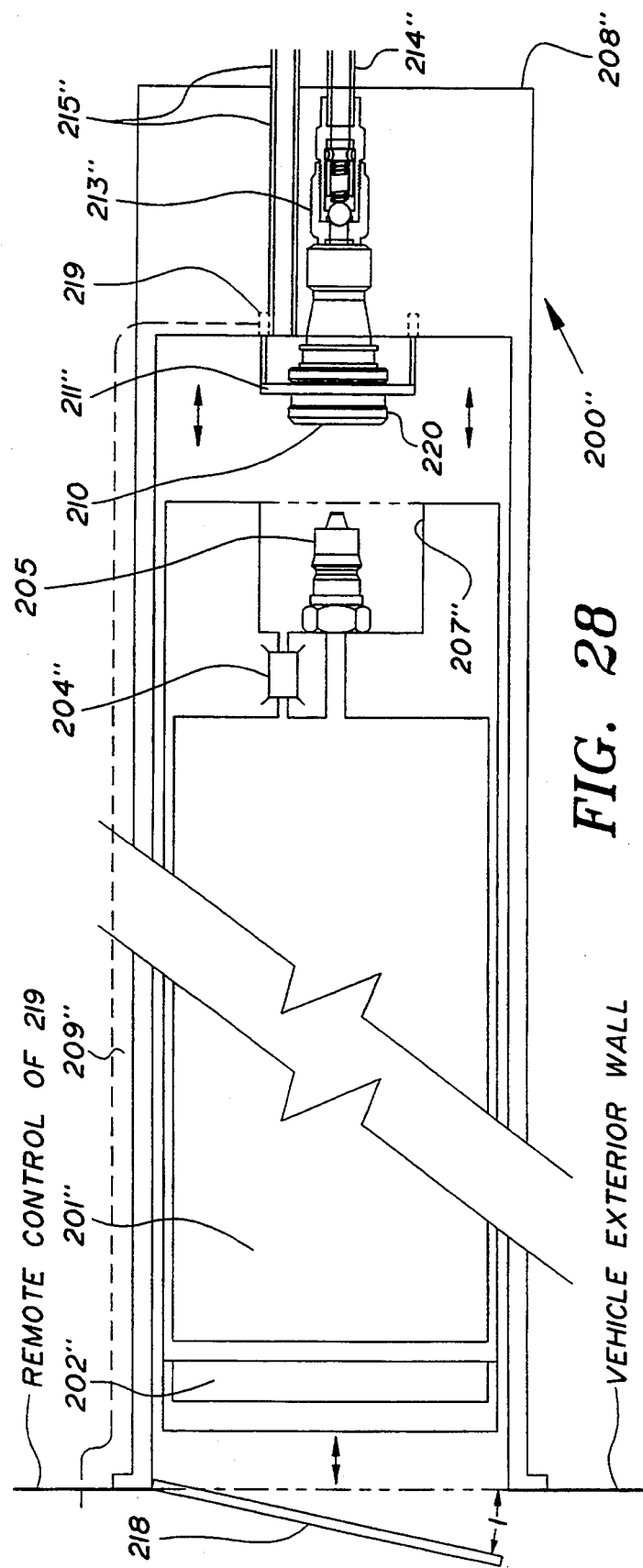
FIG. 28 depicts an elevation view, partly in section, of an embodiment of an interchangeable gaseous fuel storage reservoir in accordance with the present invention, mounted in a tube-shaped mounting base module.
Figure 30:
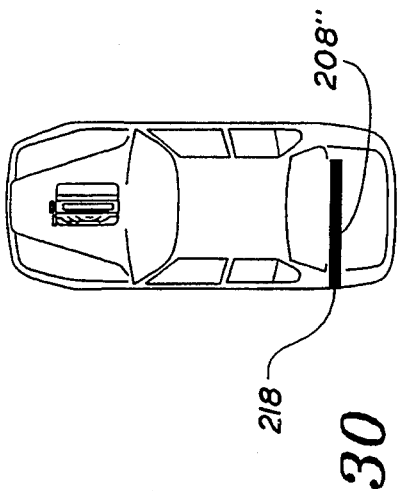
FIG. 30 depicts a plan view of a vehicle having an interchangeable gaseous fuel storage reservoir in accordance with the present invention, mounted in a tube-shaped base module in the side of the vehicle, and showing the location of the tube-shaped base module.
Figure 29:
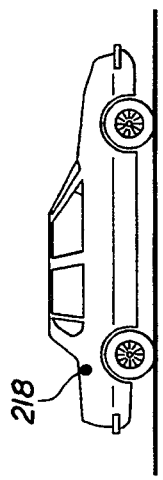
FIG. 29 depicts an elevation view of the side of a vehicle having an interchangeable gaseous fuel storage reservoir in accordance with the present invention, mounted in a tube-shaped base module in the side of the vehicle, and showing the exterior door for the base module.

FIGS. 28, 29 and 30 show an interchangeable storage reservoir system 200" where the interchangeable reservoir 201" is disposed within a base module 208" having tube-shaped sides 209". Interchangeable storage reservoir system 200" operates similarly to the operation of FIG. 25 with the difference that the base module sides 209" are horizontal and tube-shaped, and form a sealed compartment for the interchangeable storage reservoir. At the end of the sides 209" forming the tube is a door 218 that conceals the storage reservoir, and seals the end of the tube. This system allows the interchangeable storage reservoir 201" to be exchanged from the outside of the vehicle, as shown in FIGS. 29 and 30. The mating of the male and female quick-connect nozzles is achieved by sliding the interchangeable storage reservoir 201 through base module sides 209". In this case, the base module release 211" is preferably operated by mechanical or electrical means (remotely) to disengage the lock-ring of the female quick-connect nozzle 210, such as by, for example, solenoid 219.

The interchangeable gaseous fuel reservoirs are constructed to handle the requirements of the gaseous fuels stored in them. These interchangeable gaseous fuel reservoirs can be constructed for propane (LPG), compressed natural gas (CNG), sewer gas, hydrogen, etc.

Since the reservoir 201 (or 201 or 201') is refilled remotely of the vehicle, it can be filled by weight of the fuel. If the two compartment design previously described is employed, the primary compartment of the interchangeable reservoir can be filled completely.

Although these means and devices are primarily for use in a vehicle, there are applications outside of vehicle use. This includes, for example, stationary and non-stationary combustion engines such as cutting tools, lawnmowers, chain saws, air pumps, boats, etc.

Although the invention has been described in accordance with preferred embodiments, it will be seen by those skilled in the art that many modifications can be made within the spirit and scope of the present invention, and there is no intention to limit the scope of the present invention to any of these embodiments. Rather, the scope of the present invention is to be measured by the appended claims.

What is claimed is:

1. A storage reservoir for gaseous fuel comprising:
 a primary compartment and a secondary compartment substantially smaller than said primary compartment, each of said primary and said secondary compartments having separate outlets,
 means for filling said primary compartment with gaseous fuel,
 a spring loaded relief valve operatively connected between said primary compartment and said secondary expansion compartment and adapted to permit flow only from said primary compartment to said secondary compartment and when a minimum differential pressure exists across said spring loaded relief valve,
 a first spring loaded check valve operatively connected between said primary compartment and said output conduit and adapted to permit only outflow from the output of said primary compartment and only when at least a first minimum differential pressure exists across said first spring loaded check valve,
 a second spring loaded check valve operatively connected between said secondary compartment and said output conduit and adapted to permit only outflow from the output of said secondary compartment and only when at least a second minimum differential pressure exists across said second spring loaded check valve, said second minimum differential pressure being less than said first minimum differential pressure so that outflow from said secondary compartment will be favored over outflow from said primary compartment.

2. The storage reservoir defined in claim 1, wherein said primary and secondary compartments have integrally connected external pressure containing walls, and have an internal separating wall between them.

3. The storage reservoir defined in claim 1, wherein said primary and secondary compartments are substantially separate.

4. The storage reservoir defined in claim 1, wherein said secondary compartment is contained within said primary compartment.

5. The storage reservoir defined in claim 1, wherein said first differential pressure is at least sufficient to prevent formation of a vacuum in said primary compartment.

6. The storage reservoir defined in claim 1, wherein at least said primary compartment is generally horizontally disposed.

7. The storage reservoir defined in claim 6, wherein said secondary compartment is also generally horizontally disposed.

* * * * *